(12) United States Patent
Mori

(10) Patent No.: US 10,054,791 B2
(45) Date of Patent: Aug. 21, 2018

(54) IMAGING LENS AND IMAGING APPARATUS

(71) Applicant: FUJIFILM Corporation, Tokyo (JP)

(72) Inventor: Masao Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/359,632

(22) Filed: Nov. 23, 2016

(65) Prior Publication Data

US 2017/0153448 A1    Jun. 1, 2017

(30) Foreign Application Priority Data

Nov. 30, 2015  (JP) .................................. 2015-233341

(51) Int. Cl.

| | |
|---|---|
| G02B 9/62 | (2006.01) |
| G02B 21/02 | (2006.01) |
| G02B 15/14 | (2006.01) |
| G02B 3/02 | (2006.01) |
| G02B 27/00 | (2006.01) |
| B60R 1/08 | (2006.01) |
| B60R 1/12 | (2006.01) |
| B60R 11/04 | (2006.01) |
| G02B 13/00 | (2006.01) |
| H04N 5/247 | (2006.01) |
| H04N 7/18 | (2006.01) |

(52) U.S. Cl.
CPC .......... *G02B 27/0025* (2013.01); *B60R 1/081* (2013.01); *B60R 1/12* (2013.01); *B60R 11/04* (2013.01); *G02B 13/0045* (2013.01); *B60R 2001/1253* (2013.01); *G02B 9/62* (2013.01); *H04N 5/247* (2013.01); *H04N 7/181* (2013.01)

(58) Field of Classification Search
CPC .......... G02B 9/62; G02B 13/00; G02B 13/02; G02B 13/18; G02B 15/177; G02B 21/02
USPC ................ 359/761, 756, 746, 714, 682, 659
See application file for complete search history.

(56) References Cited

U.S. PATENT DOCUMENTS

| 4,806,001 A | 2/1989 | Okabe et al. |
|---|---|---|
| 2010/0046094 A1 | 2/2010 | Asami |

FOREIGN PATENT DOCUMENTS

| JP | S62-173415 A | 7/1987 |
|---|---|---|
| JP | 2646350 B2 | 8/1997 |
| JP | H10-111454 A | 4/1998 |
| JP | 2004-145256 A | 5/2004 |
| JP | 2009-216858 A | 9/2009 |
| JP | 2010-072622 A | 4/2010 |
| JP | 4556382 B2 | 10/2010 |
| JP | 5143595 B2 | 2/2013 |
| JP | 2014-010399 A | 1/2014 |
| JP | 5393276 B2 | 1/2014 |

*Primary Examiner* — Dawayne A Pinkney
(74) *Attorney, Agent, or Firm* — Studebaker & Brackett PC

(57) ABSTRACT

An imaging lens is constituted by, in order from the object side to the image side: a negative first lens having a concave surface toward the image side; a positive second lens having a convex surface toward the image side; a negative third lens having a concave surface toward the image side; a positive biconvex fourth lens; a positive biconvex fifth lens; and a negative sixth lens having a concave surface toward the object side. Conditional Formula (1) related to the radius of curvature R3 of the surface of the second lens toward the object side and the focal length f of the entire lens system is satisfied:

$$R3/f<0 \qquad (1).$$

16 Claims, 24 Drawing Sheets

FIG.1
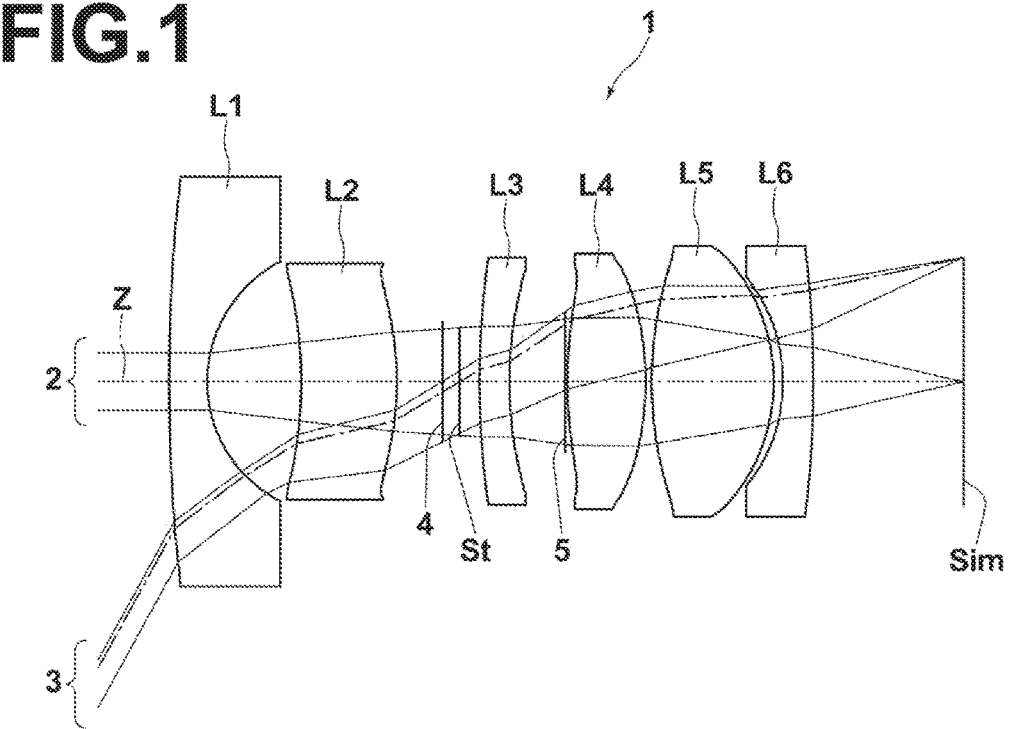
FIG.2   EXAMPLE 1
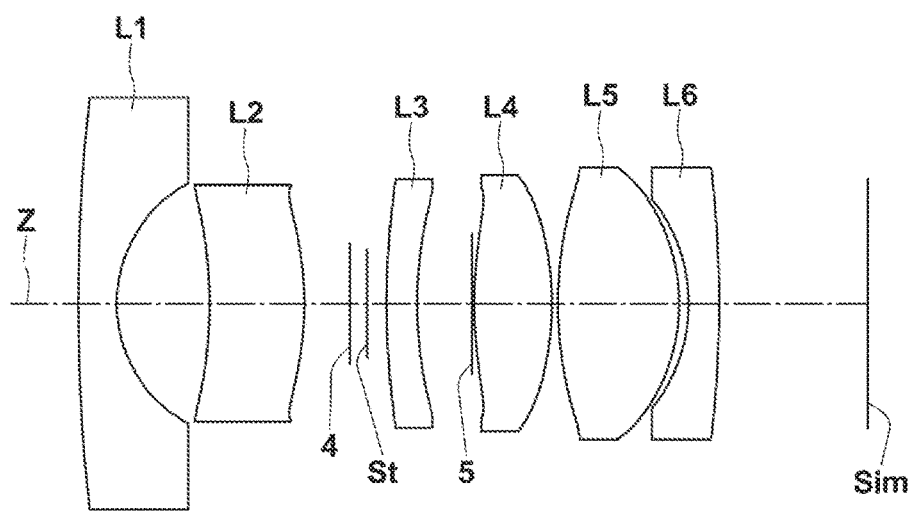

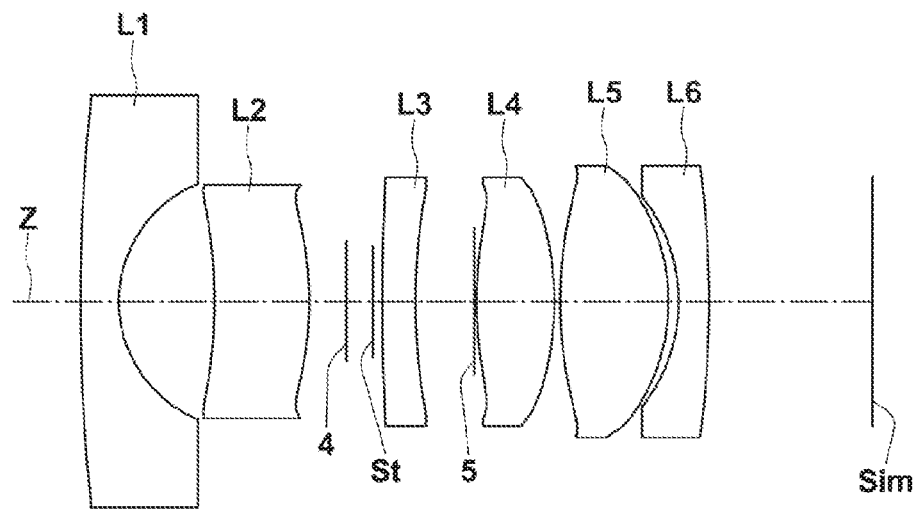
FIG.3  EXAMPLE 2
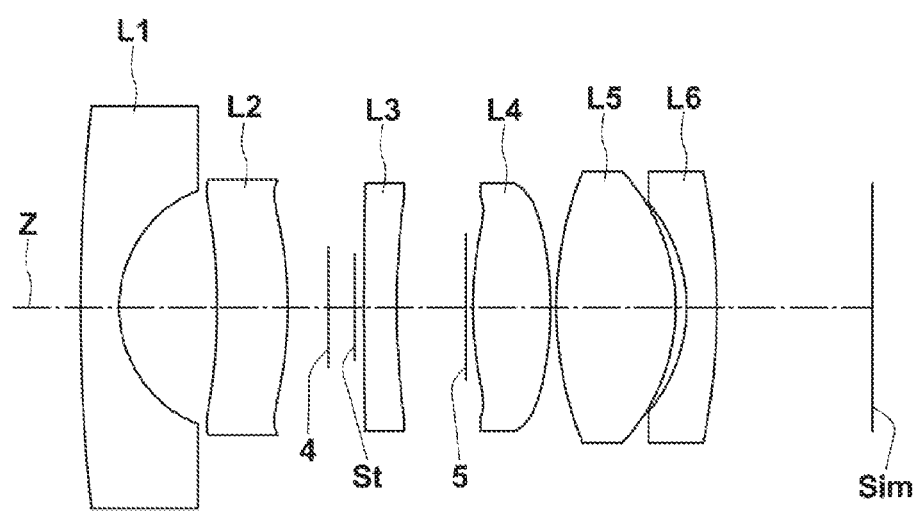
FIG.4  EXAMPLE 3

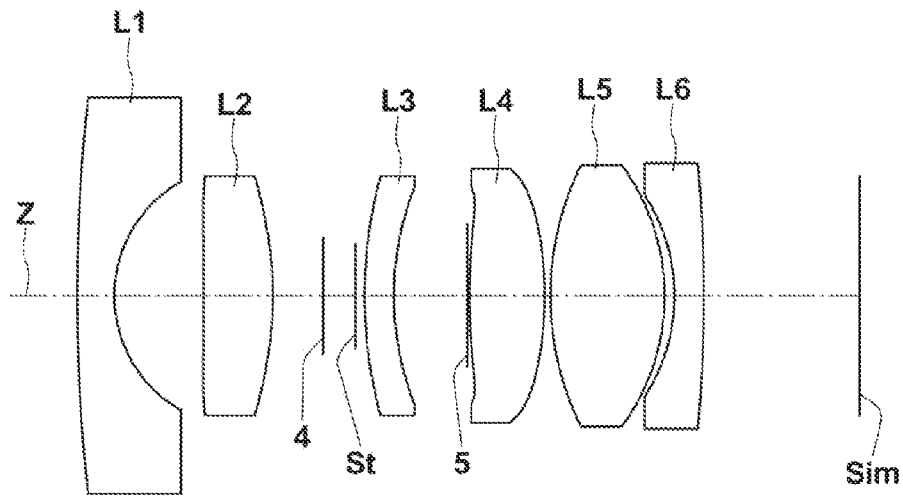
FIG.5     EXAMPLE 4
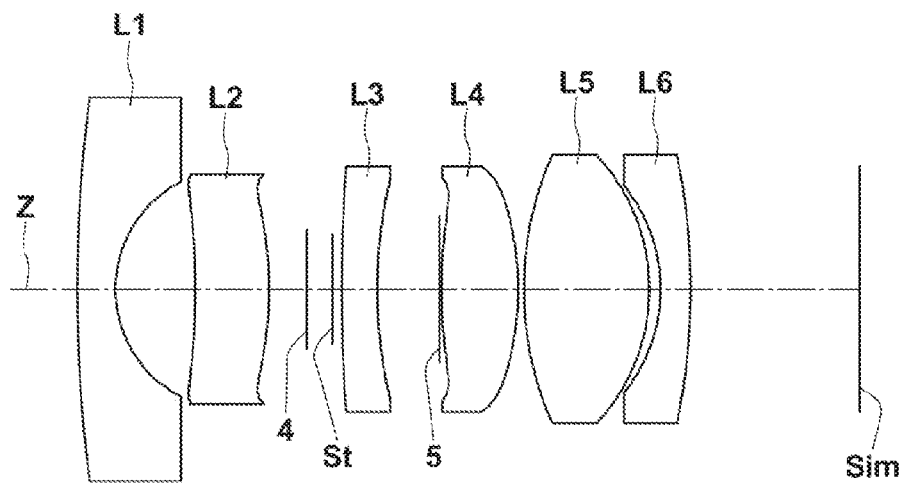
FIG.6     EXAMPLE 5

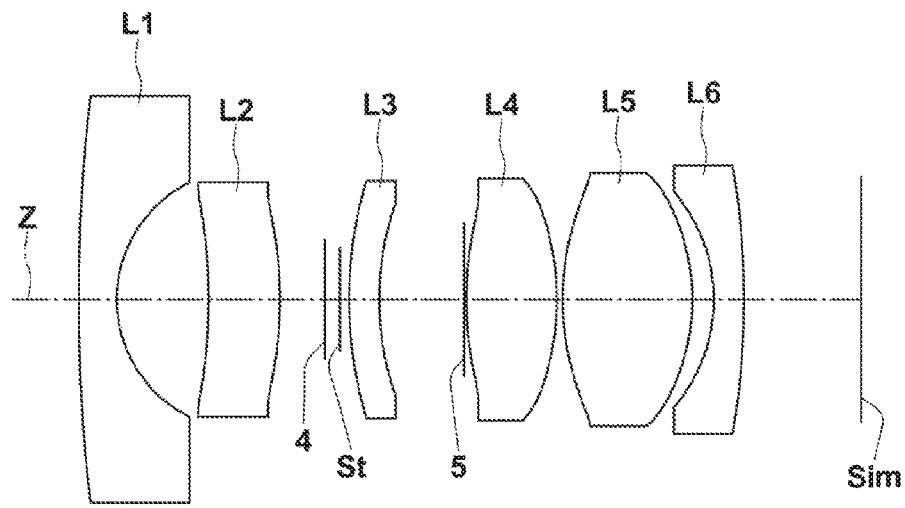
FIG.7  EXAMPLE 6
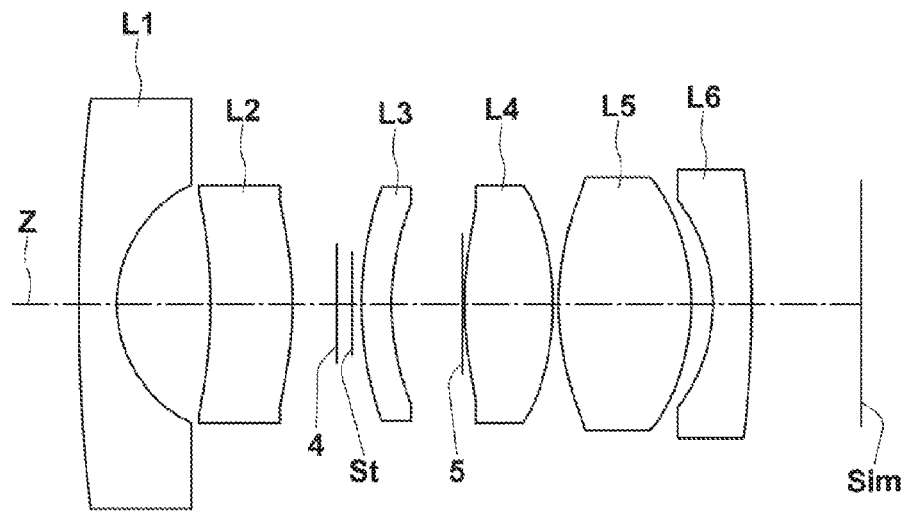
FIG.8  EXAMPLE 7

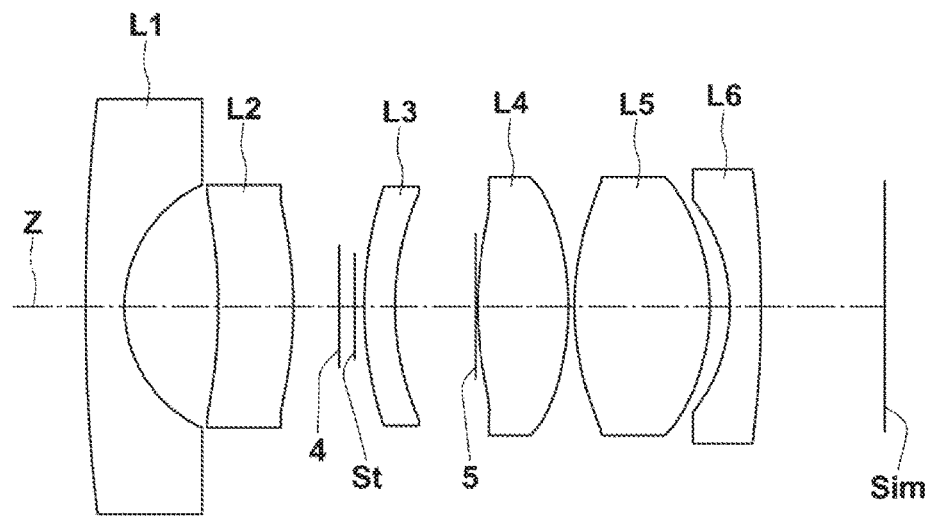
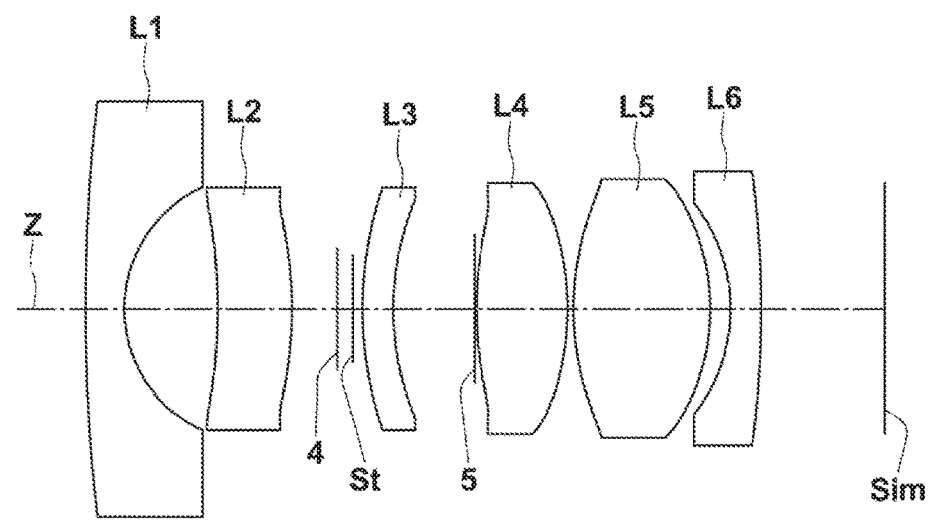

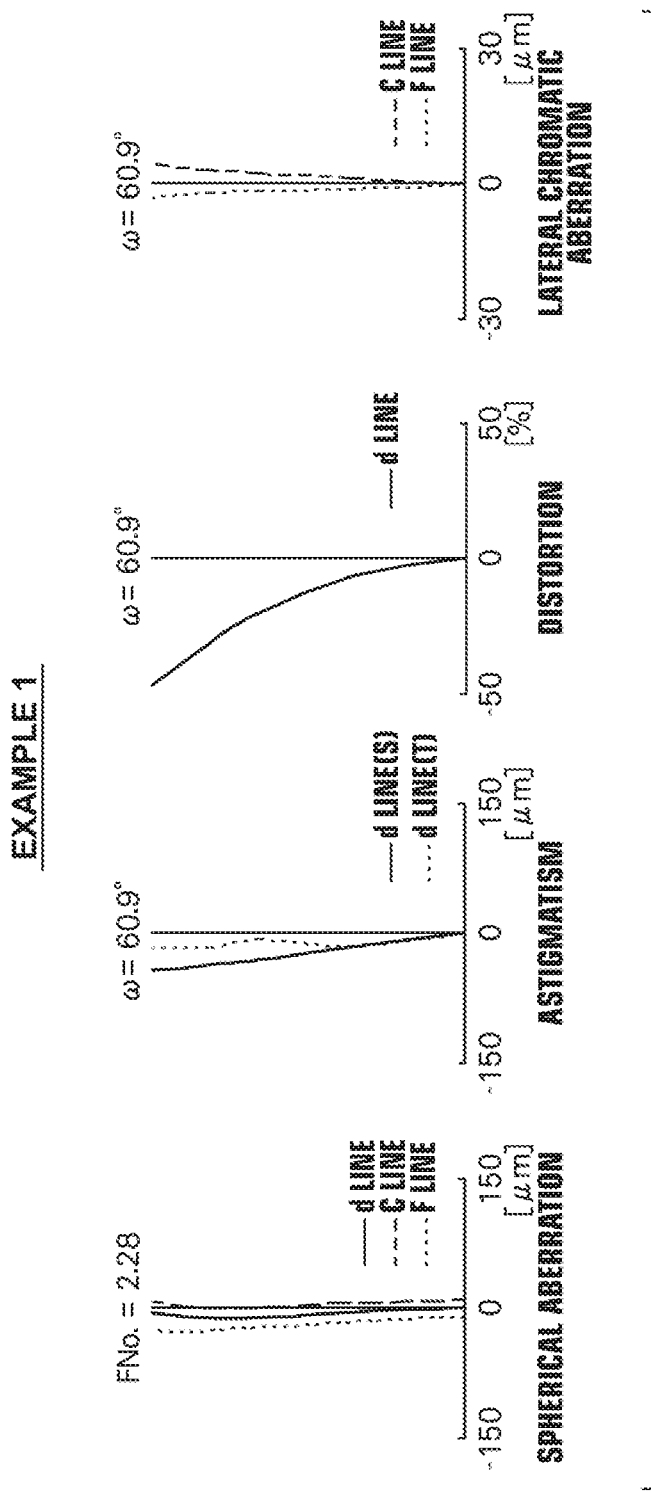

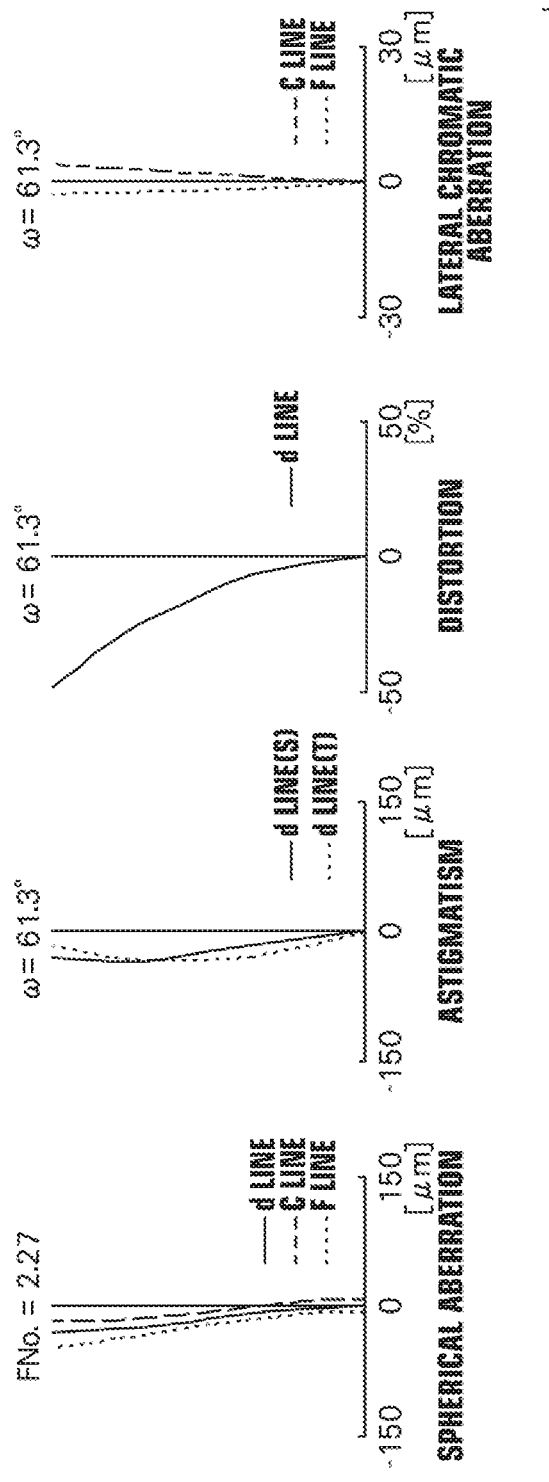

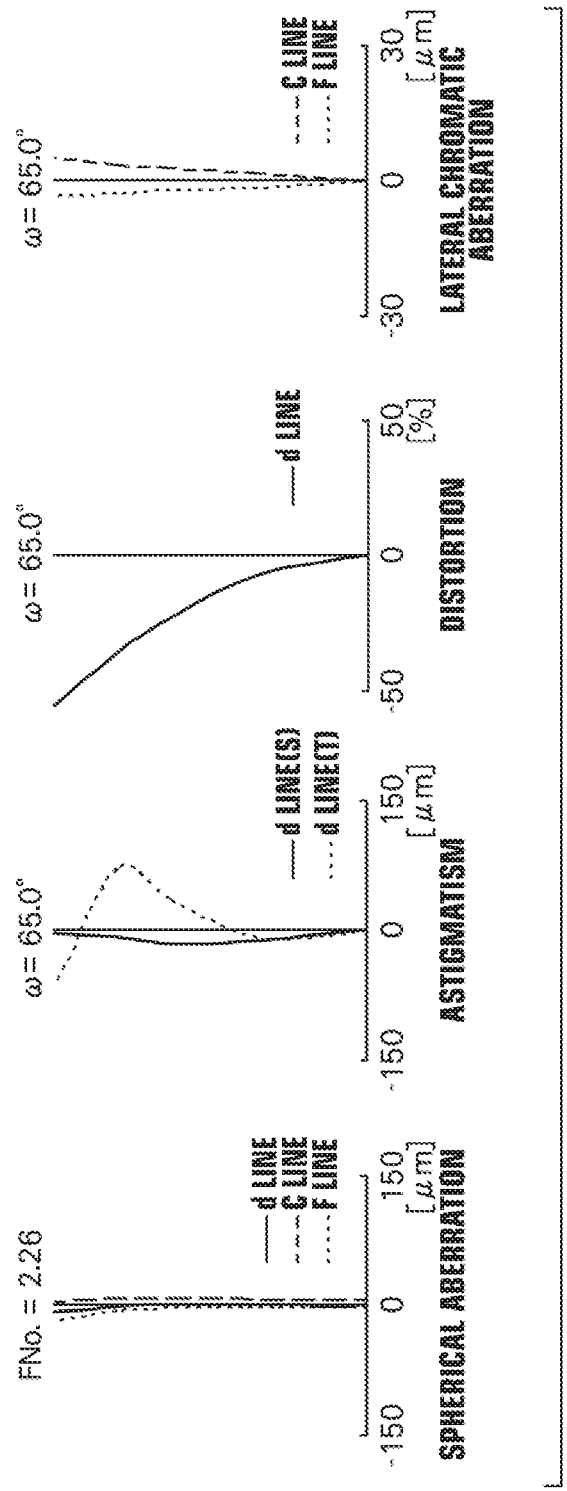

FIG.18 EXAMPLE 8

IMAGING LENS AND IMAGING APPARATUS

CROSS REFERENCE TO RELATED APPLICATIONS

The present application claims priority under 35 U.S.C. § 119 to Japanese Patent Application No. 2015-233341 filed on Nov. 30, 2015. The above application is hereby expressly incorporated by reference, in its entirety, into the present application.

BACKGROUND

The present disclosure is related to an imaging lens which can be favorably utilized in a vehicle mounted camera, a surveillance camera, a camera for a portable terminal, etc., and to an imaging apparatus equipped with this imaging lens.

Recently, vehicle mounted cameras have been being employed to assist drivers in confirming blind spots toward the sides and the rear, to perform image recognition of the vicinity of vehicles. Meanwhile, surveillance cameras are also being widely used for the purpose of preventing crime, keeping records, etc. There is demand for imaging lenses for use in such cameras to have favorable performance, while being of compact configurations. A lens system having six lenses may be considered as an imaging lens that satisfies this demand. Japanese Patent No. 2646350, Japanese Patent No. 4556382, Japanese Unexamined Patent Publication No. H10 (1998)-111454, Japanese Unexamined Patent Publication No. 2014-010399, Japanese Patent No. 5393276, and Japanese Patent No. 5143595 disclose lens systems having six lens configurations.

SUMMARY

There is demand for imaging lenses for use in vehicle mounted cameras and surveillance cameras to have small F numbers such that these cameras will be utilizable even during nighttime. In addition, it is desired for such imaging lenses to have wide angles of view and to be capable of obtaining favorable images not only at the central portion of an image formation region, but also through the periphery of the image formation region.

However, it cannot be said that the F number of the lens system disclosed in Japanese Patent No. 2646350 is sufficiently small to be employed in a vehicle mounted camera or a surveillance. In addition, there is a large amount of residual aberrations, and therefore high resolution cannot be obtained through the peripheral portions of the image formation region thereof. The lens systems having six lens configurations disclosed in Japanese Patent No. 4556382 and Japanese Unexamined Patent Publication No. H10 (1998)-111454 do not sufficiently correct chromatic aberrations and comatic aberration, and therefore high resolution cannot be obtained through the peripheral portions of the image formation region. A further widening of the angle of view is desired in the imaging lenses disclosed in Japanese Unexamined Patent Publication No. 2014-010399, Japanese Patent No. 5393276, and Japanese Patent No. 5143595, in order to meet recent demand.

The present disclosure has been developed in view of the foregoing circumstances. The present disclosure provides an imaging lens having a small F number and a wide angle of view, which is configured to be compact and is capable of obtaining images which have favorable image quality from the center portion through the peripheral portions of an image formation region, as well as an imaging apparatus equipped with this imaging lens.

An imaging lens of the present disclosure consists of, in order from the object side to the image side:

a first lens having a negative refractive power and a concave surface toward the image side;

a second lens having a positive refractive power and a convex surface toward the image side;

a third lens having a negative refractive power and a concave surface toward the image side;

a fourth lens having a positive refractive power and is of a biconvex shape;

a fifth lens having a positive refractive power and is of a biconvex shape; and a sixth lens having a negative refractive power and a concave surface toward the object side; and Conditional Formula (1) below is satisfied:

$$R3/f<0 \tag{1}$$

wherein R3 is the radius of curvature of the surface of the second lens toward the object side, and f is the focal length of the entire lens system.

In the imaging lens of the present disclosure, it is more preferable for Conditional Formula (1-1) below to be satisfied.

$$-300<R3/f<-2 \tag{1-1}$$

In the imaging lens of the present disclosure, it is preferable for Conditional Formula (2) below to be satisfied, and more preferable for Conditional Formula (2-1) below to be satisfied.

$$-2.1<f1/f<-1.3 \tag{2}$$

$$-2.0<f1/f<-1.4 \tag{2-1}$$

wherein f1 is the focal length of the first lens, and f is the focal length of entire lens system.

In the imaging lens of the present disclosure, it is preferable for Conditional Formula (3) below to be satisfied, and more preferable for Conditional Formula (3-1) below to be satisfied.

$$-3.5<R4/f<-2.0 \tag{3}$$

$$-3.2<R4/f<-2.2 \tag{3-1}$$

wherein R4 is the radius of curvature of the surface of the second lens toward the image side, and f is the focal length of the entire lens system.

In the imaging lens of the present disclosure, it is preferable for Conditional Formula (4) below to be satisfied, and more preferable for Conditional Formula (4-1) below to be satisfied.

$$-5<f12/f<-2 \tag{4}$$

$$-4.7<f12/f<-2.3 \tag{4-1}$$

wherein f12 is the combined focal length of the first lens and the second lens, and f is the focal length of the entire lens system.

In the imaging lens of the present disclosure, it is preferable for Conditional Formula (5) below to be satisfied, and more preferable for Conditional Formula (5-1) below to be satisfied.

$$0.9<f45/f<1.3 \tag{5}$$

$$0.9<f45/f<1.2 \tag{5-1}$$

wherein f45 is the combined focal length of the fourth lens and the fifth lens, and f is the focal length of the entire lens system.

In the imaging lens of the present disclosure, it is preferable for Conditional Formula (5) and Conditional Formula (6) below to be satisfied simultaneously. It is more preferable for Conditional Formula (5) and Conditional Formula (6-1) below to be satisfied simultaneously.

$$1.5 < f4/f < 3.0 \tag{6}$$

$$1.6 < f4/f < 2.6 \tag{6-1}$$

wherein f4 is the focal length of the fourth lens, and f is the focal length of the entire lens system.

In the imaging lens of the present disclosure, it is preferable for Conditional Formula (5) and Conditional Formula (7) below to be satisfied simultaneously. It is more preferable for Conditional Formula (5) and Conditional Formula (7-1) below to be satisfied simultaneously.

$$1.4 < f5/f < 2.2 \tag{7}$$

$$1.45 < f5/f < 2.1 \tag{7-1}$$

wherein f5 is the focal length of the fifth lens, and f is the focal length of the entire lens system.

In the imaging lens of the present disclosure, it is preferable for the material of at least one of the fourth lens and the fifth lens to satisfy Conditional Formula (8) below.

$$dN/dT < 0 \tag{8}$$

wherein dN/dT is the relative temperature coefficient of the refractive index of the material with respect to a wavelength of 632.8 nm within a temperature range from 20° C. to 40° C.

An imaging apparatus of the present disclosure is equipped with the imaging lens of the present disclosure.

Note that the above expression "consists of" means that lenses that practically have no power, optical elements other than lenses such as a stop, a cover glass, and filters, and mechanical components such as lens flanges, a lens barrel, an imaging element, a camera shake correcting mechanism, etc. may be included, in addition to the constituent elements listed above.

Note that the surface shapes, the radii of curvature, and the signs of the refractive powers of lenses in the above lens are those which are considered in the paraxial region for lenses that include aspherical surfaces. Note that the signs of the radii of curvature are positive for surface shapes which are convex toward the object side, and negative for surface shapes which are convex toward the image side.

According to the present disclosure, the power arrangement and the shape of each lens are favorably set within a lens system of a six lens configuration, and a predetermined conditional formula is satisfied. Therefore, it is possible to provide an imaging lens having a small F number and a wide angle of view, which is configured to be compact and is capable of obtaining images which have favorable image quality from the center portion through the peripheral portions of an image formation region, as well as an imaging apparatus equipped with this imaging lens.

BRIEF DESCRIPTION OF THE DRAWINGS

FIG. 1 is a collection of sectional diagrams that illustrate the lens configuration of and the paths of light beams that pass through an imaging lens according to an embodiment of the present disclosure.

FIG. 2 is a cross sectional diagram that illustrates the lens configuration of an imaging lens according to Example 1 of the present disclosure.

FIG. 3 is a cross sectional diagram that illustrates the lens configuration of an imaging lens according to Example 2 of the present disclosure.

FIG. 4 is a cross sectional diagram that illustrates the lens configuration of an imaging lens according to Example 3 of the present disclosure.

FIG. 5 is a cross sectional diagram that illustrates the lens configuration of an imaging lens according to Example 4 of the present disclosure.

FIG. 6 is a cross sectional diagram that illustrates the lens configuration of an imaging lens according to Example 5 of the present disclosure.

FIG. 7 is a cross sectional diagram that illustrates the lens configuration of an imaging lens according to Example 6 of the present disclosure.

FIG. 8 is a cross sectional diagram that illustrates the lens configuration of an imaging lens according to Example 7 of the present disclosure.

FIG. 9 is a cross sectional diagram that illustrates the lens configuration of an imaging lens according to Example 8 of the present disclosure.

FIG. 10 is a cross sectional diagram that illustrates the lens configuration of an imaging lens according to Example 9 of the present disclosure.

FIG. 11 is a collection of diagrams that illustrate aberrations of the imaging lens according to Example 1, which are spherical aberration, astigmatism, distortion, and lateral chromatic aberration in this order from the left side of the drawing sheet.

FIG. 12 is a collection of diagrams that illustrate aberrations of the imaging lens according to Example 2, which are spherical aberration, astigmatism, distortion, and lateral chromatic aberration in this order from the left side of the drawing sheet.

FIG. 13 is a collection of diagrams that illustrate aberrations of the imaging lens according to Example 3, which are spherical aberration, astigmatism, distortion, and lateral chromatic aberration in this order from the left side of the drawing sheet.

DETAILED DESCRIPTION OF THE PREFERRED EMBODIMENTS

Figure 14:
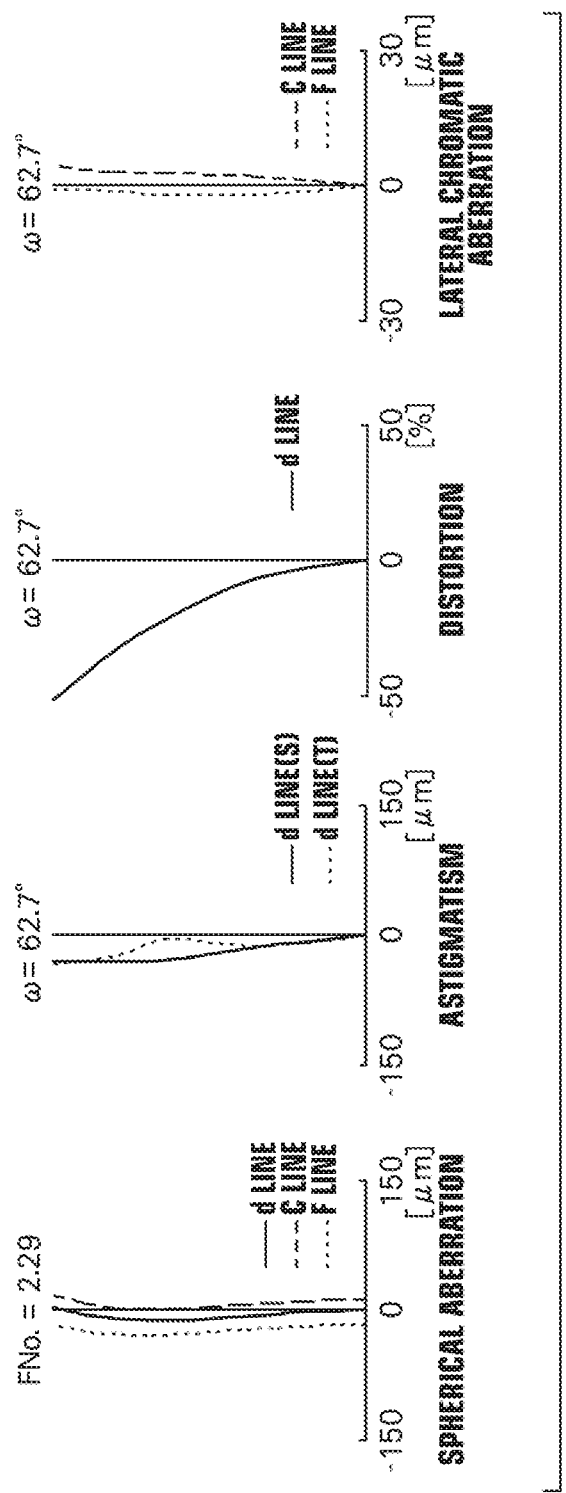
FIG. 14 is a collection of diagrams that illustrate aberrations of the imaging lens according to Example 4, which are spherical aberration, astigmatism, distortion, and lateral chromatic aberration in this order from the left side of the drawing sheet.

Hereinafter, embodiments of the present disclosure will be described in detail with reference to the attached drawings. FIG. 1 is a cross sectional diagram that illustrates the lens configuration of and the paths of light beams that pass through an imaging lens 1 according to an embodiment of the present disclosure. The example of the configuration illustrated in FIG. 1 corresponds to the configuration of an imaging lens of Example 1 to be described later. In FIG. 1, the left side is the object side, and the right side is the image side. In addition, FIG. 1 also illustrates the optical paths of an axial light beam 2 and a light beam 3 at a maximum angle of view.

As illustrated in FIG. 1, the imaging lens 1 is constituted by six lenses, which are, in order from the object side to the image side along an optical axis Z, a first lens L1 having a negative refractive power and a concave surface toward the image side; a second lens L2 having a positive refractive power and a convex surface toward the image side; a third lens L3 having a negative refractive power and a concave surface toward the image side; a fourth lens L4 having a positive refractive power and is of a biconvex shape; a fifth lens L5 having a positive refractive power and is of a biconvex shape; and a sixth lens L6 having a negative refractive power and a concave surface toward the object side.

Widening of the angle of view is facilitated by configuring the imaging lens such that the first lens L1, which is the lens most toward the object side, is a negative lens. In addition a widening of the angle of view is also facilitated by configuring the surface of the first lens L1 toward the image side to be concave. By configuring the second lens L2 to be a positive lens having a convex surface toward the image side, aberrations can be corrected at various angles of view while suppressing the generation of negative distortion. In addition, by the third lens L3 through the sixth lens L6 being of the configurations described above, these four lenses form a configuration with favorable symmetry, and aberrations can be favorably and effectively corrected.

By the configurations of the first lens L1 through the sixth lens L6 being those described above, the generation of distortion and lateral chromatic aberration can be suppressed even if the angle of view of a lens system having a small F number is widened, for example, to an angle of view of 100 degrees or greater, and it will be possible to obtain a lens system having high resolution from the central portion to the peripheral portions of an image formation region.

The imaging lens 1 is configured such that Conditional Formula (1) below is satisfied.

$$R3/f<0 \tag{1}$$

wherein R3 is the radius of curvature of the surface of the second lens toward the object side, and f is the focal length of the entire lens system.

By configuring the imaging lens such that the value of R3/f is not greater than or equal to the upper limit defined in Conditional Formula (1), it will be possible to configure the second lens L2 to be a positive meniscus lens having a convex surface toward the image side. Therefore, light rays that enter the surface of the second lens L2 toward the object side from the object side can be refracted to a great degree in a direction away from the optical axis Z while suppressing the generation of higher order aberrations. As a result, the generation of a great amount of negative distortion can be suppressed. Such a configuration is advantageous from the viewpoint of realizing favorable optical performance from the central portion to the peripheral portions of an image formation region, even in a lens system having a small F number and a wide angle of view.

Further, it is preferable for Conditional Formula (1-1) below to be satisfied.

$$-300<R3/f<-2 \tag{1-1}$$

By configuring the imaging lens such that the value of R3/f is not less than or equal to the lower limit defined in Conditional Formula (1-1), it will be possible to prevent the angle formed by a light ray that enters the surface of the second lens L2 toward the object side from the object side and a line normal to the surface at the point at which the incident light ray intersects with the surface from becoming excessively small. As a result, favorable correction of distortion will become possible. By configuring the imaging lens such that the value of R3/f is not greater than or equal to the upper limit defined in Conditional Formula (1-1), the aforementioned angle can be prevented from becoming excessively great. Therefore, the generation of higher order aberrations can be suppressed, and flare components of comatic aberrations can be suppressed particularly for peripheral light beams. As a result, aberrations can be favorably corrected throughout the entirety of an image formation region.

In addition, it is preferable for Conditional Formula (2) below to be satisfied in the imaging lens 1.

$$-2.1<f1/f<-1.3 \tag{2}$$

wherein f1 is the focal length of the first lens, and f is the focal length of entire lens system.

By configuring the imaging lens such that the value of f1/f is not less than or equal to the lower limit defined in Conditional Formula (2), negative refractive power can be prevented from becoming excessively weak, and therefore achieving a widening of the angle of view is facilitated. By configuring the imaging lens such that the value of f1/f is not greater than or equal to the upper limit defined in Conditional Formula (2), a widening of the angle of view can be achieved and the generation of a great amount of negative spherical aberration can be prevented. Therefore, favorable correction of aberrations will become possible. It is more preferable for Conditional Formula (2-1) below to be satisfied, in order to cause the advantageous effects related to Conditional Formula (2) to become more prominent.

$$-2.0 < f1/f < -1.4 \quad (2\text{-}1)$$

In addition, it is preferable for Conditional Formula (3) below to be satisfied in the imaging lens 1.

$$-3.5 < R4/f < -2.0 \quad (3)$$

wherein R4 is the radius of curvature of the surface of the second lens toward the image side, and f is the focal length of the entire lens system.

Conditional Formula (3) is a conditional formula for favorably correcting aberrations from the third lens L3 through the sixth lens L6 by refracting light rays, which are refracted in a direction away from the optical axis Z at the surface of the second lens L2 toward the object side, in a direction toward the optical direction. By Conditional Formula (3) being satisfied, the principal light rays of light beams can be returned to the vicinity of the center of the third lens L3 without higher order aberrations being generated. Therefore, an aperture stop St can be provided at a position away from an image formation plane Sim. Thereby, light rays at various angles of view can be separated and aberrations can be corrected by lenses which are positioned at the image side of the aperture stop St, and as a result, high imaging performance can be obtained. It is more preferable for Conditional Formula (3-1) below to be satisfied, in order to cause the advantageous effects related to Conditional Formula (3) to become more prominent.

$$-3.2 < R4/f < -2.2 \quad (3\text{-}1)$$

Note that it is preferable for the aperture stop St to be positioned between the surface of the second lens L2 toward the object side and the surface of the third lens L3 toward the image side. In this case, the aforementioned correction of aberrations can be performed more favorably. Further, the incident angles of principal light rays of off axis light beams that enter the image formation surface Sim can be suppressed, and therefore improvements in amounts of light at peripheral portions of the image formation region become possible. FIG. 1 illustrates an example in which the aperture stop St is positioned between the surface of the second lens L2 toward the image side and the surface of the third lens L3 toward the object side. However, the aperture stop St illustrated in FIG. 1 does not necessarily represent the size or the shape thereof, but represents the position thereof along the optical axis.

In addition, it is preferable for Conditional Formula (4) below to be satisfied in the imaging lens 1.

$$-5 < f12/f < -2 \quad (4)$$

wherein f12 is the combined focal length of the first lens and the second lens, and f is the focal length of the entire lens system.

By configuring the imaging lens such that the value of f12/f is not less than or equal to the lower limit defined in Conditional Formula (4), the negative refractive power of the first lens L1 can be prevented from becoming excessively weak and will become an appropriate value. Therefore, a widening of the angle of view is facilitated. By configuring the imaging lens such that the value of f12/f is not greater than or equal to the upper limit defined in Conditional Formula (4), the positive refractive power of the second lens L2 can be maintained at an appropriate value. Therefore, the generation of a great amount of negative distortion can be prevented, while suppressing the generation of higher order aberrations. It is more preferable for Conditional Formula (4-1) below to be satisfied, in order to cause the advantageous effects related to Conditional Formula (4) to become more prominent.

$$-4.7 < f12/f < -2.3 \quad (4\text{-}1)$$

In addition, it is preferable for Conditional Formula (5) below to be satisfied in the imaging lens 1.

$$0.9 < f45/f < 1.3 \quad (5)$$

wherein f45 is the combined focal length of the fourth lens and the fifth lens, and f is the focal length of the entire lens system.

Conditional Formula (5) is a conditional formula for appropriately maintaining the combined refractive power of the fourth lens L4 and the fifth lens L5. By configuring the imaging lens such that the value of f45/f is not less than or equal to the lower limit defined in Conditional Formula (5), the combined refractive power can be prevented from becoming excessively strong, and the generation of higher order aberrations can be suppressed. By configuring the imaging lens such that the value of f45/f is not greater than or equal to the upper limit defined in Conditional Formula (5), positive refractive power can be prevented from becoming excessively weak, and negative spherical aberration which is generated by lens groups positioned at the object side of the fourth lens L4 can be favorably corrected. It is more preferable for Conditional Formula (5-1) below to be satisfied, in order to cause the advantageous effects related to Conditional Formula (5) to become more prominent.

$$0.9 < f45/f < 1.2 \quad (5\text{-}1)$$

In addition, it is preferable for Conditional Formula (5) and Conditional Formula (6) below to be satisfied simultaneously in the imaging lens 1.

$$1.5 < f4/f < 3.0 \quad (6)$$

wherein f4 is the focal length of the fourth lens, and f is the focal length of the entire lens system.

Conditional Formula (6) is a conditional formula which is required for the fourth lens L4 to favorably correct and converge negative spherical aberration which is generated by lens groups positioned at the object side of the fourth lens L4, in order to widen the angle of view. By configuring the imaging lens such that the value of f4/f is not less than or equal to the lower limit defined in Conditional Formula (6), positive refractive power will be prevented from becoming excessively strong, and the absolute values of the radii of curvature of the lens surfaces of the fourth lens L4 toward the object side and the image side can be prevented from becoming excessively small. Therefore, the generation of higher order aberrations can be suppressed. By configuring the imaging lens such that the value of f4/f is not greater than or equal to the upper limit defined in Conditional Formula (6), positive refractive power will be prevented from becoming excessively weak, and negative spherical aberration which is generated by lens groups positioned at the object side of the fourth lens L4 can be favorably corrected. In addition, it is necessary for each of the fourth lens L4 and the fifth lens L5 to have a certain degree of refractive power. For this reason, by configuring the imaging lens such that the value of f4/f is not greater than or equal to the upper limit defined in Conditional Formula (6), the positive refractive power of the fourth lens L4 will be prevented from becoming excessively weak, the refractive power of the fifth lens L5 will be prevented from becoming excessively strong, and favorable correction of aberrations will become possible. It is more preferable for Conditional Formula (6-1) below to be satisfied, in order to cause the advantageous effects related to Conditional Formula (6) to become more prominent.

$$1.6 < f4/f < 2.6 \quad (6\text{-}1)$$

In addition, it is preferable for Conditional Formula (5) and Conditional Formula (7) below to be satisfied simultaneously in the imaging lens 1.

$$1.4 < f5/f < 2.2 \quad (7)$$

wherein f5 is the focal length of the fifth lens, and f is the focal length of the entire lens system.

Conditional Formula (7) is a conditional formula which is required for the fifth lens L5 to favorably correct and converge negative spherical aberration which is generated by lens groups positioned at the object side of the fourth lens L4, in order to widen the angle of view. By configuring the imaging lens such that the value of f5/f is not less than or equal to the lower limit defined in Conditional Formula (7), positive refractive power will be prevented from becoming excessively strong, and the absolute values of the radii of curvature of the lens surfaces of the fifth lens L5 toward the object side and the image side can be prevented from becoming excessively small. Therefore, the generation of higher order aberrations can be suppressed. By configuring the imaging lens such that the value of f5/f is not greater than or equal to the upper limit defined in Conditional Formula (7), positive refractive power will be prevented from becoming excessively weak, and negative spherical aberration which is generated by lens groups positioned at the object side of the fourth lens L4 can be favorably corrected. In addition, it is necessary for each of the fourth lens L4 and the fifth lens L5 to have a certain degree of refractive power. For this reason, by configuring the imaging lens such that the value of f5/f is not greater than or equal to the upper limit defined in Conditional Formula (7), the positive refractive power of the fifth lens L5 will be prevented from becoming excessively weak, the refractive power of the fourth lens L4 will be prevented from becoming excessively strong, and favorable correction of aberrations will become possible. It is more preferable for Conditional Formula (7-1) below to be satisfied, in order to cause the advantageous effects related to Conditional Formula (7) to become more prominent.

$$1.45 < f5/f < 2.1 \quad (7\text{-}1)$$

It is even more preferable for both of Conditional Formulae (6) and (7) to be satisfied simultaneously with Conditional Formula (5), for the reasons described above.

In addition, it is preferable for the material of at least one of the fourth lens L4 and the fifth lens L5 to satisfy Conditional Formula (8) below.

$$dN/dT < 0 \quad (8)$$

wherein dN/dT is the relative temperature coefficient of the refractive index of the material with respect to a wavelength of 632.8 nm within a temperature range from 20° C. to 40° C.

By employing a material that satisfies Conditional Formula (8), the focal point position moving greatly in a direction that approaches the lens accompanying increases in temperature can be suppressed. In addition, the focal point position moving greatly in a direction away from the lens accompanying decreases in temperature can also be suppressed. For this reason, the amount of movement of an image formation position caused by expansion and contraction of a casing and changes in the focal point position of the lens system accompanying changes in temperature can be decreased. Therefore, deterioration in resolution due to changes in temperature can be suppressed. There is demand for imaging lenses for use in vehicle mounted cameras, surveillance cameras, cameras for portable terminals, etc. to have high weather resistance properties and to be utilizable in a wide temperature range from outdoors in cold weather climates to inside vehicles during the summer in tropical climates. Therefore, a configuration that satisfies Conditional Formula (8) is advantageous from this viewpoint.

In addition, the imaging lens 1 may be provided with members among the lenses that cut off a portion of peripheral light rays within a range that does not cause practical problems with respect to peripheral amounts of light, such as stops. Peripheral light rays are light rays that pass through the peripheral portion of the entrance pupil of the optical system from among light rays from an off axis object point. By providing a member that cuts off peripheral light rays in this manner, the image quality can be improved at the peripheral portion of the image formation region. In addition, this member cuts off light that generates ghosts, and therefore it becomes possible to reduce the generation of ghosts. FIG. 1 illustrates an example in which a first light shielding member 4 and a second light shielding member 5 having circular openings centered on the optical axis and cut off a portion of peripheral light rays are respectively positioned between the second lens L2 and the third lens L3 and between the third lens L3 and the fourth lens L4. Note that the first light shielding member 4 and the second light shielding member 5 illustrated in FIG. 1 do not necessarily represent the sizes or shapes thereof, but their positions along the optical axis.

In addition, it is preferable for a protective multiple layer film coating to be administered in the case that the present imaging lens is to be utilized in extreme environments. Further, an antireflection coating may be administered in addition to the protective coating, in order to reduce ghost light and the like during utilization of the imaging lens.

In addition, in the case that this imaging lens is applied to an imaging apparatus, a cover glass, prisms, and various filters, such as an infrared cutoff filter and a low pass filter, may be provided between the lens system and an image formation plane Sim, depending on the configuration of the imaging apparatus. Note that these filters may be provided among the lenses instead of being provided between the lens system and the image formation plane Sim. As a further alternative, coatings that exhibit the same effects as these filters may be administered on the lens surfaces of the lenses.

Arbitrary combinations of the preferred configurations and possible configurations described above, including the configurations related to the conditional formulae, are possible. It is preferable for these configurations to be selectively adopted as appropriate according to desired specifications. For example, the imaging lens 1 may be configured to have a small F number and a wide angle of view, configured to be compact and capable of obtaining images which have favorable image quality from the center portion through the peripheral portion of an image formation region, by adopting the configurations described above as appropriate. Note that here, a small F number means that the F number is 2.3 or less, and a wide angle of view means that the full angle of view is 100 degrees or greater.

Next, examples of numerical values of the imaging lens of the present disclosure will be described.

Example 1

FIG. 2 is a cross sectional diagram that illustrates the lens configuration of the imaging lens of Example 1. The imaging lens of Example 1 is constituted by six lenses, which are the first lens L1 through the sixth lens L6. In FIG. 2, the left side is the object side and the right side is the image side. FIG. 2 also illustrates an aperture stop St as well as the aforementioned first light shielding member 4 and the second light shielding member 5. Note that the aperture stop St, the first light shielding member 4, and the second light shielding member 5 illustrated in FIG. 2 do not necessarily represent the sizes and shapes thereof, but only the positions thereof along the optical axis Z.

Basic lens data are shown in Table 1, and data related to aspherical surface coefficients are shown in Table 2 for the imaging lens of Example 1. In Table 1, ith (i=1, 2, 3, . . . ) lens surface numbers that sequentially increase from the object side to the image side, with the surface toward the object side of the constituent element at the most object side designated as first, are shown in the column Si. The radii of curvature of ith surfaces are shown in the column Ri. The distances between an ith surface and an i+1 st surface along the optical axis Z are shown in the column Di. The refractive indices with respect to the d line (wavelength: 587.6 nm) of jth (j=1, 2, 3, . . . ) constituent elements that sequentially increase from the object side to the image side, with the constituent element at the most object side designated as first, are shown in the column Ndj. The Abbe's numbers with respect to the d line of jth constituent elements are shown in the column νdj.

Here, the signs of the radii of curvature are positive in cases that the surface shape is convex toward the object side, and negative in cases that the surface shape is convex toward the image side. Table 1 also shows data regarding the aperture stop St. Text reading "(St)" is indicated along with a surface number in the column of the surface number at the surface corresponding to the aperture stop. The value in the lowermost row of column Di is the distance between the surface most toward the image side within the table and an image formation plane Sim. Data related to the first light shielding member 4 and the second light shielding member 5 are summarized with those of the other Examples as shown in Table 19.

The values of the focal length f of the entire lens system, the back focus Bf as an air converted length, the F number F No., and the full angle of view 2ω with reference to the d line are shown above the frame of Table 1.

In Table 1, the surface numbers of aspherical surfaces are appended with the mark "*", and numerical values that represent paraxial radii of curvature are shown as the radii of curvature of the aspherical surfaces. Table 2 shows aspherical surface coefficients related to these aspherical surfaces. The aspherical surface coefficients are the values of the coefficients KA and Am (m=4, 6, 8, 10, 12, 14) in the aspherical surface formula below.

$$Zd = \frac{C \times h^2}{1 + \sqrt{1 - KA \times C^2 \times h^2}} + \sum_m Am \times h^m$$

wherein Zd is the depth of the aspherical surface (the length of a normal line that extends from a point on the aspherical surface at a height h to a plane perpendicular to the optical axis that contacts the apex of the aspherical surface), h is the height (the distance from the optical axis), C is the paraxial curvature, and KA and Am are aspherical surface coefficients (m=4, 6, 8, 10, 12, 14).

In the data shown in each of the tables below, degrees are used as the units for angles and mm are used as the units for lengths. However, it is possible for optical systems to be proportionately enlarged or proportionately reduced and utilized. Therefore, other appropriate units may be used. In addition, numerical values which are rounded off at a predetermined number of digits are shown in each of the tables below.

TABLE 1

| Example 1 |
| f = 3.36, Bf = 3.92, F No. = 2.28, 2ω = 121.8° |

| Si | Ri | Di | Ndj | νdj |
| --- | --- | --- | --- | --- |
| *1 | 46.3782 | 1.0099 | 1.58313 | 59.38 |
| *2 | 3.3919 | 2.4498 | | |
| *3 | −11.8721 | 2.4923 | 1.80610 | 40.93 |
| *4 | −7.8254 | 1.6399 | | |
| 5 (St) | ∞ | 0.5168 | | |
| 6 | 22.0925 | 0.7999 | 1.92286 | 18.90 |
| 7 | 10.4213 | 1.5098 | | |
| *8 | 11.4513 | 2.0399 | 1.80610 | 40.93 |
| *9 | −7.5199 | 0.1551 | | |
| *10 | 9.5049 | 3.1808 | 1.61881 | 63.85 |
| *11 | −4.7573 | 0.2499 | | |
| 12 | −4.2346 | 0.7999 | 1.92286 | 18.90 |
| 13 | −28.6463 | 3.9229 | | |

TABLE 2

| Example 1 | | | | |
| --- | --- | --- | --- | --- |
| Surface Number | 1 | 2 | 3 | 4 |
| KA | 1.0256714E+00 | 9.8030967E−01 | 4.9823534E+00 | −2.9119851E+00 |
| A4 | −5.8067886E−05 | −2.8193943E−04 | −2.4551451E−05 | −1.3518732E−04 |
| A6 | 1.7109404E−06 | 2.1941078E−05 | −1.4720654E−04 | 3.5092421E−05 |
| A8 | 8.6387002E−08 | −2.6438429E−06 | 3.3454386E−05 | 7.3383896E−06 |
| A10 | 3.0651735E−10 | −1.0321548E−06 | −2.5251731E−06 | −1.9981789E−06 |
| A12 | −3.8902319E−11 | −2.4352323E−08 | −8.2938235E−08 | 1.7803953E−07 |
| A14 | −2.2571402E−12 | 6.5133835E−09 | 2.4689797E−08 | 2.2661663E−08 |
| Surface Number | 8 | 9 | 10 | 11 |
| KA | −2.3407927E+00 | −6.6734789E−02 | 4.1008059E−01 | 9.6949840E−01 |
| A4 | 3.4747350E−04 | −1.0415036E−04 | −4.2442346E−05 | 1.7917967E−05 |
| A6 | −9.7158216E−05 | −5.3441524E−05 | −4.4486444E−06 | 1.3296517E−05 |

TABLE 2-continued

| | Example 1 | | | |
|---|---|---|---|---|
| A8 | −2.7989415E−06 | 1.0659431E−07 | 7.9941785E−07 | 6.4552362E−07 |
| A10 | −8.8763973E−07 | −8.1479409E−07 | 2.9678085E−08 | −3.3943306E−08 |
| A12 | −8.0268334E−08 | −1.6493278E−09 | 3.0389364E−08 | 5.4481103E−08 |
| A14 | −6.2337163E−09 | 2.1371982E−09 | −4.7342740E−09 | −3.4611587E−09 |

Figure 20:
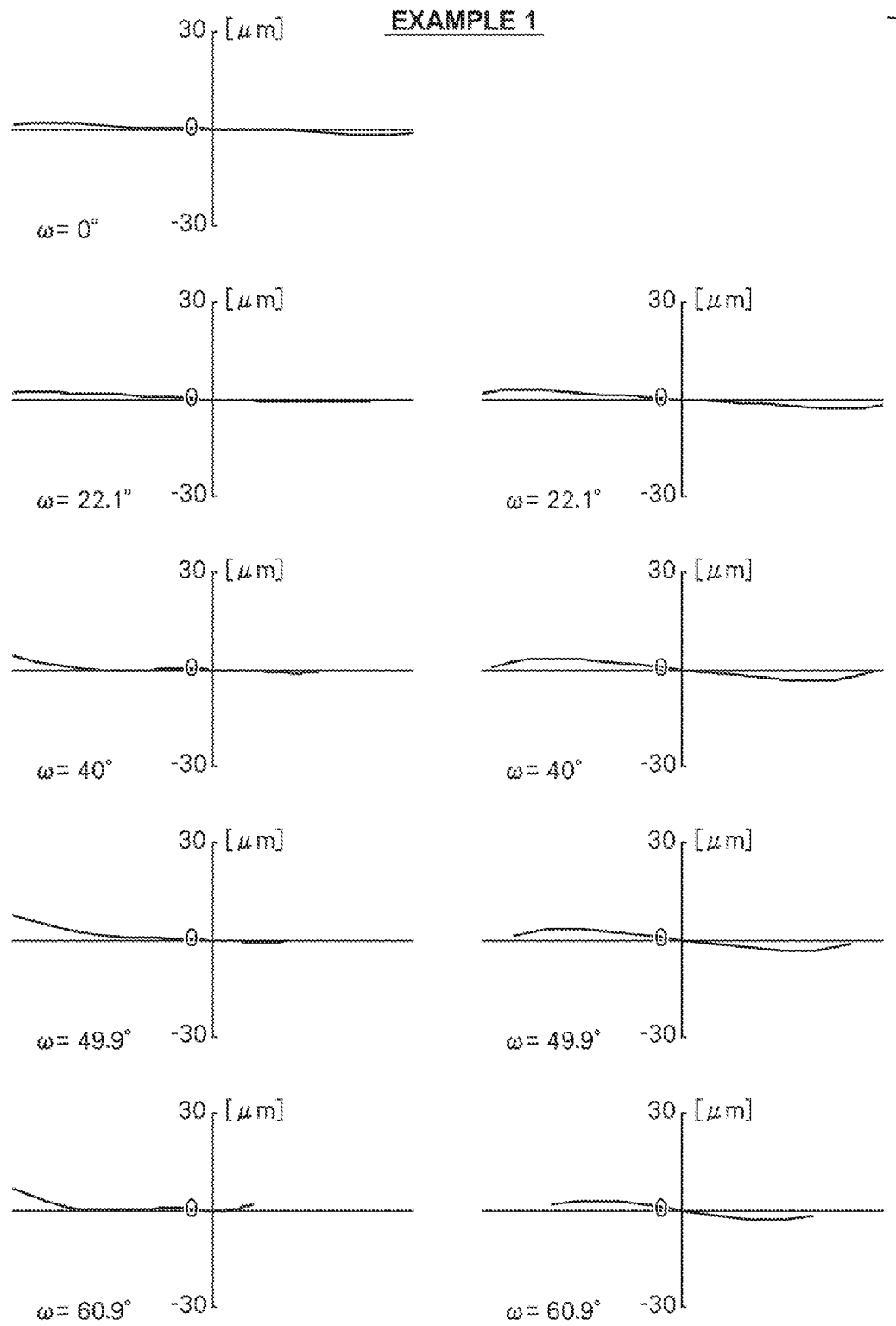
FIG. 20 is a collection of diagrams that illustrate transverse aberrations of the imaging lens of Example 1.

FIG. 11 and FIG. 20 are collections of diagrams that illustrate various aberrations of the imaging lens of Example 1 in a state focused on an object at infinity. In FIG. 11, diagrams that illustrate spherical aberration, astigmatism, distortion, and lateral chromatic aberration are illustrated in this order from the left side of the drawing sheet. The diagram that illustrates spherical aberration shows aberrations related to the d line (wavelength: 587.6 nm), the C line (wavelength: 656.3 nm), and the F line (wavelength: 486.1 nm), as a solid line, a long broken line, and a dotted line, respectively. In the diagram that illustrates astigmatism, aberrations in the sagittal direction and aberrations in the tangential direction related to the d line are indicated by a solid line and a dotted line, respectively. In the diagram that illustrates distortion, aberrations related to the d line are shown by a solid line. In the diagram that illustrates lateral chromatic diagram, aberrations related to the C line and the F line are shown as a long broken line and a dotted line, respectively. In the diagram that illustrates spherical aberration, "FNo." denotes the F number. In the other diagrams that illustrate the aberrations, ω denotes half angles of view.

FIG. 20 is a collection of diagrams that illustrate transverse aberrations with respect to half angles of view w in the tangential direction at the left side of the drawing sheet, and transverse aberrations with respect to half angles of view w in the sagittal direction at the right side of the drawing sheet. These diagrams illustrate transverse aberration related to the d line. Note that the aberration diagrams of FIG. 11 and FIG. 20 are for a state in which the first light shielding member 4 and the second light shielding member 5 are provided as shown in Table 19.

The symbols, the meanings, and the manners in which the various pieces of data are described in the description of Example 1 above are the same for the examples to be described below unless otherwise noted. Therefore, redundant descriptions will be omitted hereinafter.

Example 2

Figure 21:
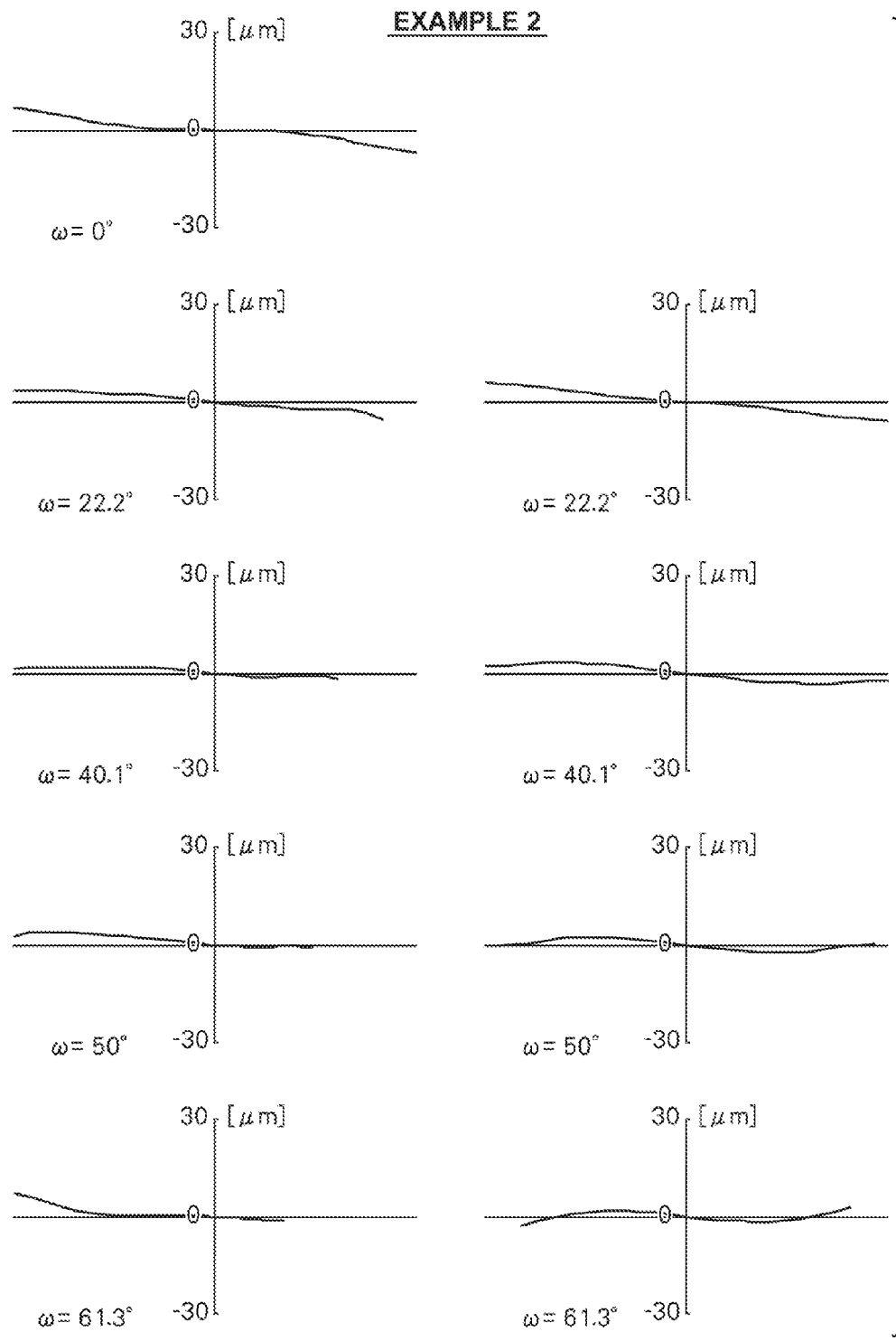
FIG. 21 is a collection of diagrams that illustrate transverse aberrations of the imaging lens of Example 2.

FIG. 3 is a cross sectional diagram that illustrates the lens configuration of the imaging lens of Example 2. Basic lens data are shown in Table 3 and aspherical surface coefficients are shown in Table 4 for the imaging lens of Example 2. In addition, FIG. 12 and FIG. 21 are collections of diagrams that illustrate various aberrations of the imaging lens of Example 2 in a state focused on an object at infinity.

TABLE 3

| Example 2 f = 3.35, Bf = 4.30, F No. = 2.27, 2ω = 122.6° | | | | |
|---|---|---|---|---|
| Si | Ri | Di | Ndj | vdj |
| *1 | 46.3783 | 1.0112 | 1.58313 | 59.38 |
| *2 | 3.1881 | 2.5131 | | |
| *3 | −13.4465 | 2.5001 | 1.80610 | 40.93 |
| *4 | −8.0867 | 1.6700 | | |
| 5 (St) | ∞ | 0.2499 | | |
| 6 | 63.9530 | 0.8632 | 1.92286 | 18.90 |
| 7 | 15.0562 | 1.6101 | | |
| *8 | 10.5055 | 2.0399 | 1.80610 | 40.93 |
| *9 | −7.6909 | 0.1549 | | |
| *10 | 10.4629 | 2.8474 | 1.61881 | 63.85 |
| *11 | −4.9605 | 0.2699 | | |
| 12 | −4.2728 | 0.8000 | 1.92286 | 18.90 |
| 13 | −25.9702 | 4.3020 | | |

TABLE 4

| Example 2 | | | | |
|---|---|---|---|---|
| Surface Number | 1 | 2 | 3 | 4 |
| KA | 1.0015654E+00 | 9.8034752E−01 | 4.9874050E+00 | −2.9118623E+00 |
| A4 | −5.8089014E−05 | −2.8201766E−04 | −2.4589817E−05 | −1.3639095E−04 |
| A6 | 1.7351094E−06 | 2.3925431E−05 | −1.4718131E−04 | 3.5103502E−05 |
| A8 | 5.0519007E−08 | −2.6455255E−06 | 3.3461694E−05 | 7.6640931E−06 |
| A10 | 3.2883104E−10 | −9.3781604E−07 | −2.5125247E−06 | −2.0643524E−06 |
| A12 | −4.0227881E−11 | −2.4352323E−08 | −2.1118172E−07 | −1.5804988E−08 |
| A14 | −2.2293092E−12 | 4.7205806E−09 | 4.6863149E−08 | 7.0019599E−08 |
| Surface Number | 8 | 9 | 10 | 11 |
| KA | −2.3378548E+00 | −6.5770611E−02 | 4.0941414E−01 | 9.7069922E−01 |
| A4 | 3.4548187E−04 | −1.0411375E−04 | −4.2403539E−05 | 1.7967529E−05 |
| A6 | −9.7186039E−05 | −5.3459088E−05 | −4.4562616E−06 | 1.3278971E−05 |
| A8 | −3.0722073E−06 | 1.0501901E−07 | 7.9299463E−07 | 6.4335672E−07 |
| A10 | −1.7446341E−06 | −8.1956928E−07 | 3.3983273E−08 | −4.4569123E−08 |
| A12 | 3.2937745E−07 | −3.2259681E−08 | 4.1915724E−08 | 2.3208298E−08 |
| A14 | −5.3243745E−08 | −1.3452632E−09 | −7.9359766E−09 | −7.7610359E−09 |

Example 3

Figure 22:
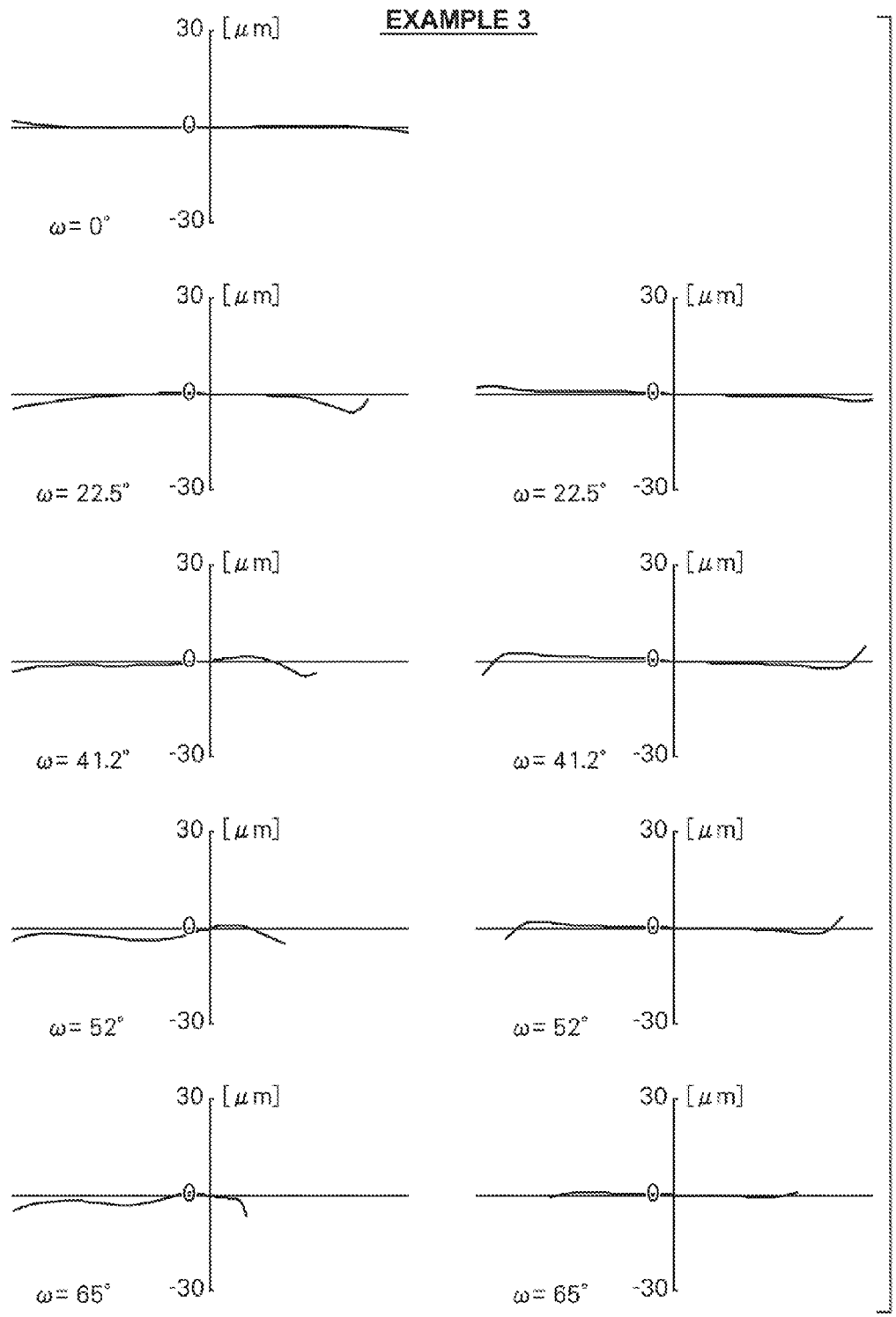
FIG. 22 is a collection of diagrams that illustrate transverse aberrations of the imaging lens of Example 3.

FIG. 4 is a cross sectional diagram that illustrates the lens configuration of the imaging lens of Example 3. Basic lens data are shown in Table 5 and aspherical surface coefficients are shown in Table 6 for the imaging lens of Example 3. In addition, FIG. 13 and FIG. 22 are collections of diagrams that illustrate various aberrations of the imaging lens of Example 3 in a state focused on an object at infinity.

TABLE 5

Example 3
f = 3.31, Bf = 4.12, F No. = 2.26, 2ω = 130.0°

| Si | Ri | Di | Ndj | vdj |
|---|---|---|---|---|
| 1 | 46.3786 | 1.0200 | 1.58313 | 59.38 |
| 2 | 3.2332 | 2.5830 | | |
| *3 | −16.2066 | 1.8749 | 1.80610 | 40.93 |
| *4 | −9.4864 | 1.7610 | | |
| 5 (St) | ∞ | 0.2500 | | |
| 6 | 212.1128 | 0.8567 | 1.95906 | 17.47 |
| 7 | 20.7117 | 2.0115 | | |
| *8 | 9.4219 | 2.0465 | 1.80610 | 40.93 |
| *9 | −9.1476 | 0.1549 | | |
| 10 | 9.2275 | 3.1492 | 1.61881 | 63.85 |
| 11 | −5.0420 | 0.2840 | | |
| 12 | −4.1226 | 0.7999 | 1.95906 | 17.47 |
| 13 | −17.3321 | 4.1164 | | |

TABLE 6

| Surface Number | 3 | 4 | 8 | 9 |
|---|---|---|---|---|
| KA | 4.9943054E+00 | −3.2075243E+00 | −2.8591645E+00 | −5.9096017E−02 |
| A4 | −3.4305098E−04 | −1.6248734E−04 | 3.0021340E−04 | −1.0139010E−04 |
| A6 | −9.8793083E−05 | −1.0979007E−05 | −9.0667963E−05 | −6.0973192E−05 |
| A8 | 3.4851534E−05 | 7.7385234E−06 | −1.1500681E−06 | −1.7379319E−07 |
| A10 | −2.9967738E−06 | 1.4849994E−07 | 3.8849226E−07 | −7.6958361E−07 |
| A12 | −4.5125120E−08 | 1.4258051E−08 | −6.1071120E−08 | −1.1377396E−08 |
| A14 | 1.8338019E−08 | 7.2166943E−09 | −8.3794403E−08 | −1.5655533E−08 |

Example 4

Figure 23:
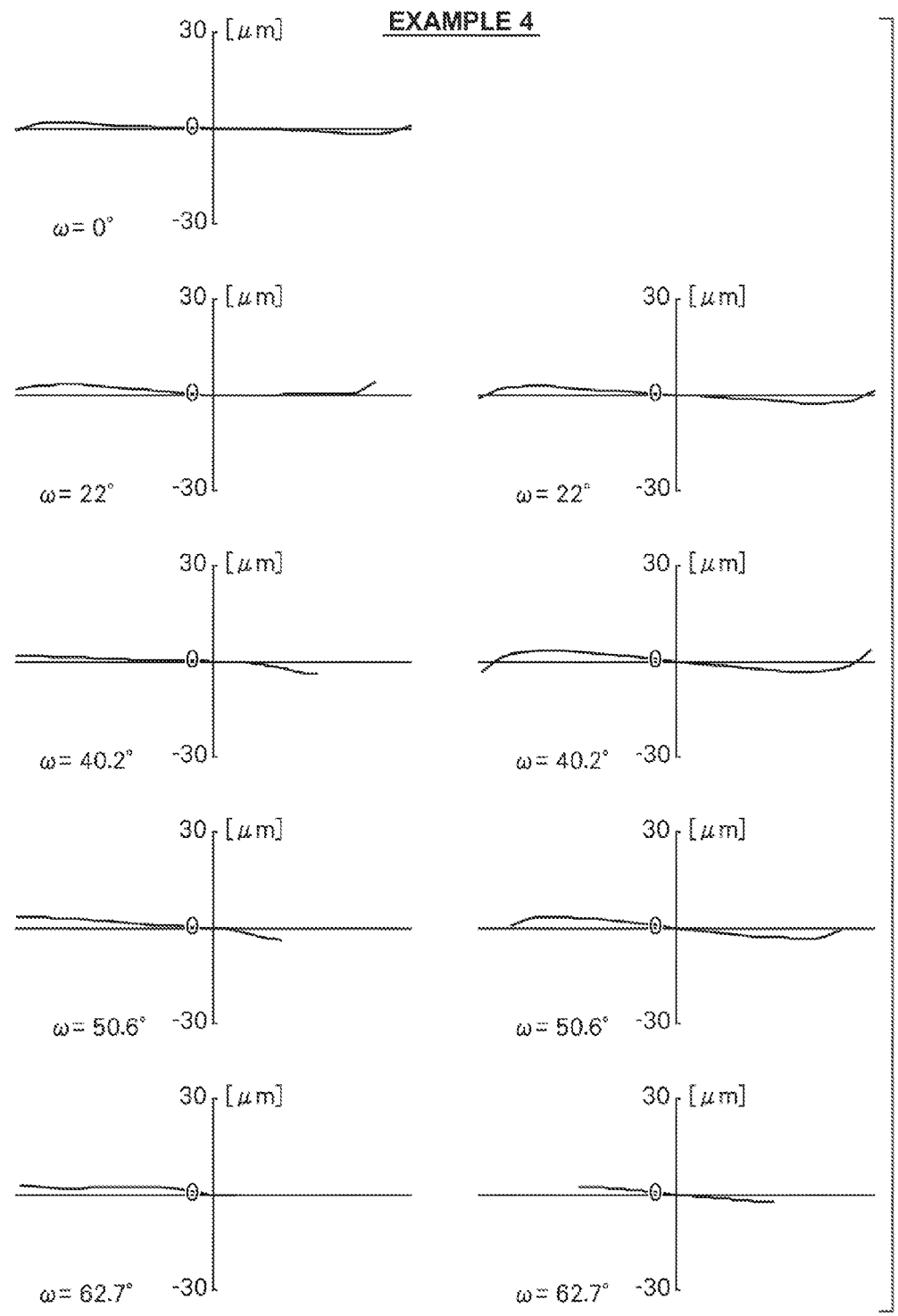
FIG. 23 is a collection of diagrams that illustrate transverse aberrations of the imaging lens of Example 4.

FIG. 5 is a cross sectional diagram that illustrates the lens configuration of the imaging lens of Example 4. Basic lens data are shown in Table 7 and aspherical surface coefficients are shown in Table 8 for the imaging lens of Example 4. In addition, FIG. 14 and FIG. 23 are collections of diagrams that illustrate various aberrations of the imaging lens of Example 4 in a state focused on an object at infinity.

TABLE 7

Example 4
f = 3.38, Bf = 4.27, F No. = 2.29, 2ω = 125.4°

| Si | Ri | Di | Ndj | vdj |
|---|---|---|---|---|
| 1 | 46.3782 | 1.0201 | 1.77198 | 49.64 |
| 2 | 3.4707 | 2.4399 | | |
| *3 | −891.9862 | 1.8921 | 1.80610 | 40.93 |
| *4 | −10.1687 | 2.2620 | | |
| 5 (St) | ∞ | 0.2501 | | |
| 6 | 11.9890 | 0.8000 | 1.85000 | 22.84 |
| 7 | 7.7518 | 2.0614 | | |
| *8 | 16.6100 | 2.0630 | 1.80610 | 40.93 |
| *9 | −9.3348 | 0.1549 | | |
| 10 | 7.7060 | 3.1235 | 1.70788 | 54.61 |
| 11 | −5.8063 | 0.2700 | | |
| 12 | −4.8699 | 0.8000 | 1.95906 | 17.47 |
| 13 | −39.2316 | 4.2683 | | |

TABLE 8

Example 4

| Surface Number | 3 | 4 | 8 | 9 |
|---|---|---|---|---|
| KA | 5.0000090E+00 | 8.5019836E−01 | −2.7418395E+00 | −1.7492582E−01 |
| A4 | −2.0050681E−04 | −1.8499323E−04 | 3.0297894E−04 | −8.7593446E−05 |

TABLE 8-continued

| | Example 4 | | | |
|---|---|---|---|---|
| Surface Number | 3 | 4 | 8 | 9 |
| A6 | −1.1390021E−04 | 2.7187491E−05 | −1.0507689E−04 | −6.1083751E−05 |
| A8 | 3.7236185E−05 | 7.8688595E−06 | 2.7014417E−07 | 6.3442454E−07 |
| A10 | −2.8017799E−06 | −8.1502255E−07 | 3.9331389E−07 | −8.2423003E−07 |
| A12 | 6.8811735E−09 | −3.6155519E−08 | −4.3585420E−07 | −8.3853579E−09 |
| A14 | 7.1620841E−09 | 4.6971967E−09 | −5.5369866E−09 | −2.0161176E−09 |

Example 5

Figure 15:
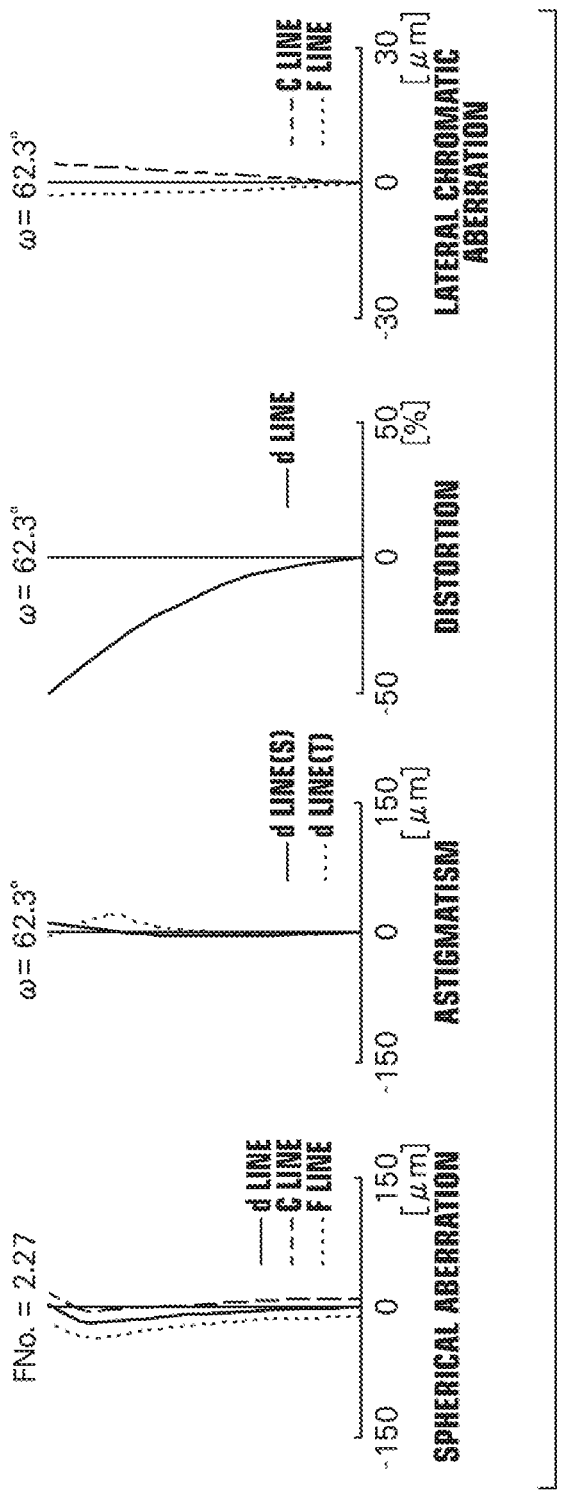
FIG. 15 is a collection of diagrams that illustrate aberrations of the imaging lens according to Example 5, which are spherical aberration, astigmatism, distortion, and lateral chromatic aberration in this order from the left side of the drawing sheet.
Figure 24:
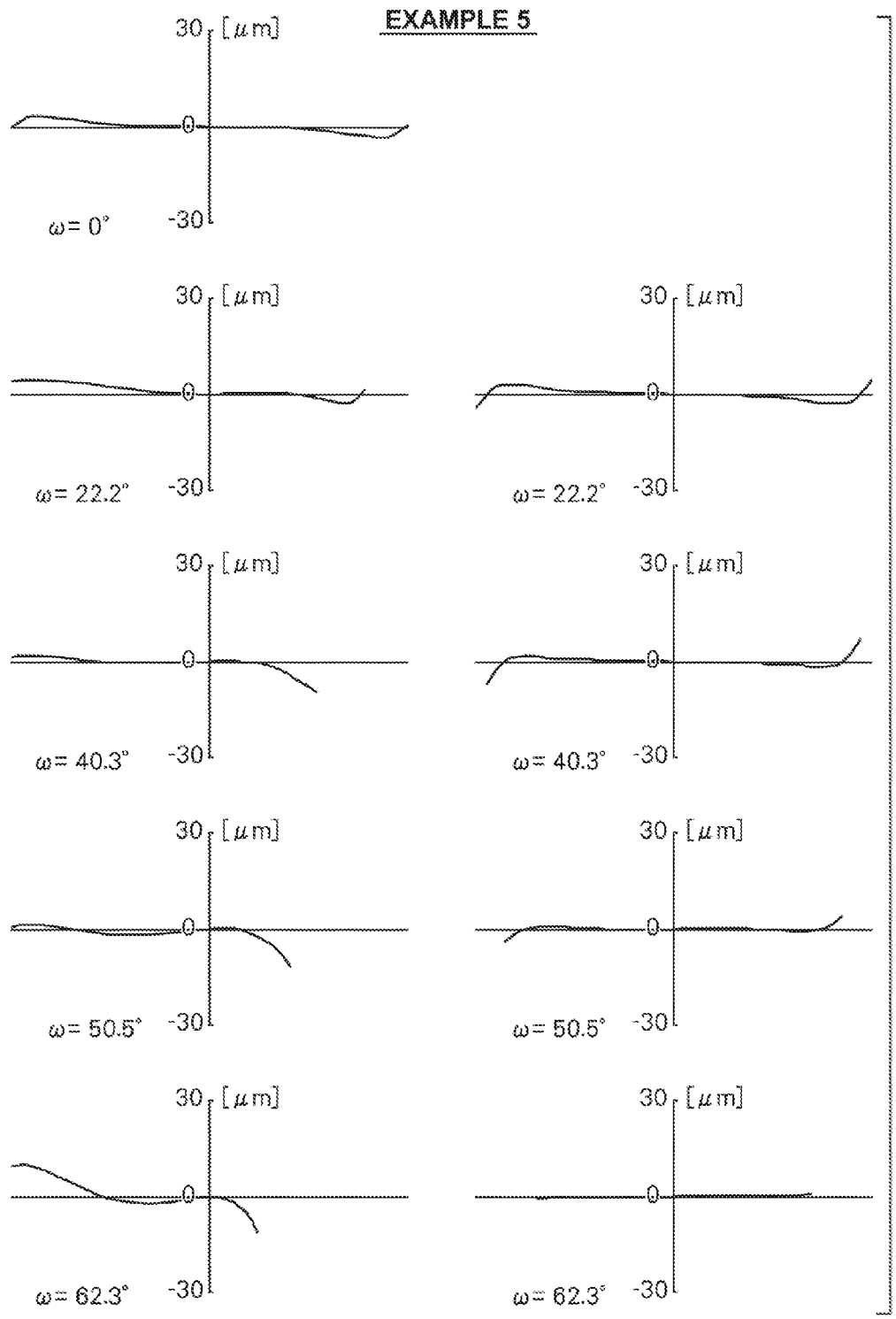
FIG. 24 is a collection of diagrams that illustrate transverse aberrations of the imaging lens of Example 5.

FIG. 6 is a cross sectional diagram that illustrates the lens configuration of the imaging lens of Example 5. Basic lens data are shown in Table 9 and aspherical surface coefficients are shown in Table 10 for the imaging lens of Example 5. In addition, FIG. 15 and FIG. 24 are collections of diagrams that illustrate various aberrations of the imaging lens of Example 5 in a state focused on an object at infinity.

TABLE 9

| | Example 5 f = 3.34, Bf = 4.51, F No. = 2.27, 2ω = 124.6° | | | |
|---|---|---|---|---|
| Si | Ri | Di | Ndj | νdj |
| 1 | 37.3673 | 1.0199 | 1.69350 | 53.20 |
| 2 | 3.1247 | 2.1266 | | |
| *3 | −19.7727 | 1.9732 | 1.80610 | 40.93 |
| *4 | −9.0515 | 1.6799 | | |
| 5 (St) | ∞ | 0.2524 | | |
| 6 | 45.3710 | 0.9487 | 1.84666 | 23.78 |
| 7 | 12.3515 | 1.7098 | | |
| *8 | 12.9401 | 2.0401 | 1.80610 | 40.93 |
| *9 | −7.7675 | 0.1549 | | |
| 10 | 8.4761 | 3.3422 | 1.61881 | 63.85 |
| 11 | −5.0533 | 0.2997 | | |
| 12 | −4.2261 | 0.7999 | 1.95906 | 17.47 |
| 13 | −17.0894 | 4.5100 | | |

Example 6

Figure 16:
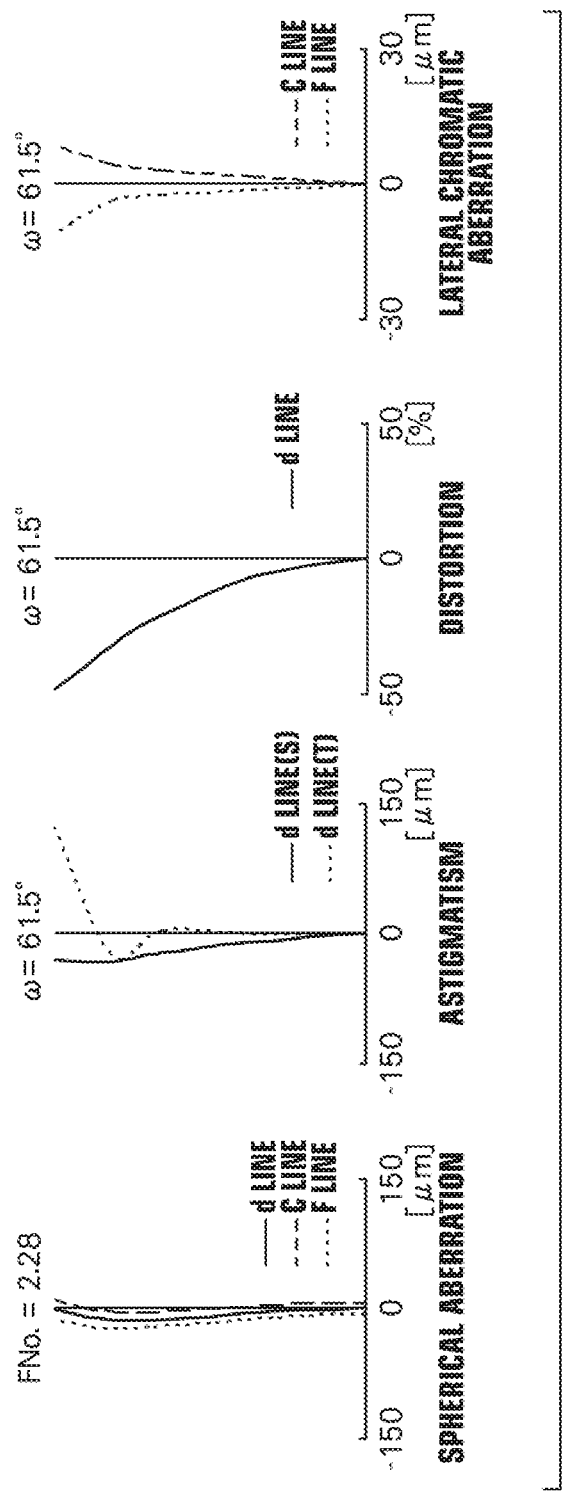
FIG. 16 is a collection of diagrams that illustrate aberrations of the imaging lens according to Example 6, which are spherical aberration, astigmatism, distortion, and lateral chromatic aberration in this order from the left side of the drawing sheet.
Figure 25:
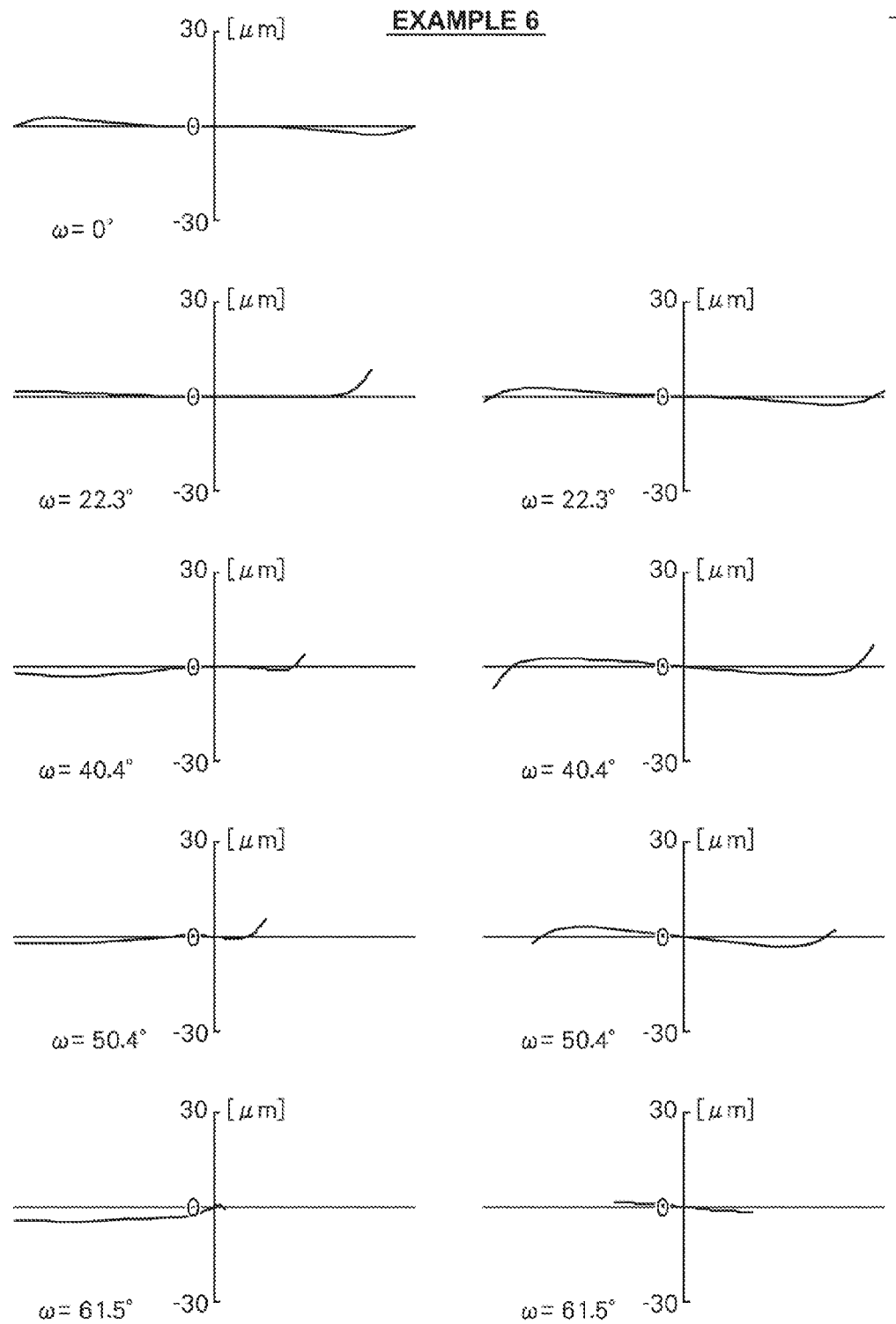
FIG. 25 is a collection of diagrams that illustrate transverse aberrations of the imaging lens of Example 6.

FIG. 7 is a cross sectional diagram that illustrates the lens configuration of the imaging lens of Example 6. Basic lens data are shown in Table 11 and aspherical surface coefficients are shown in Table 12 for the imaging lens of Example 6. In addition, FIG. 16 and FIG. 25 are collections of diagrams that illustrate various aberrations of the imaging lens of Example 6 in a state focused on an object at infinity.

TABLE 11

| | Example 6 f = 3.33, Bf = 3.13, F No. = 2.28, 2ω = 123.0° | | | |
|---|---|---|---|---|
| Si | Ri | Di | Ndj | νdj |
| *1 | 46.3777 | 1.0100 | 1.58313 | 59.38 |
| *2 | 3.3214 | 2.4470 | | |
| *3 | −14.6002 | 1.9000 | 1.80610 | 40.93 |
| *4 | −9.7900 | 1.5900 | | |
| 5 (St) | ∞ | 0.2500 | | |
| 6 | 10.6791 | 0.8000 | 1.92286 | 18.90 |
| 7 | 7.4590 | 2.3180 | | |
| *8 | 8.5434 | 2.4120 | 1.65160 | 58.55 |
| *9 | −6.9284 | 0.1550 | | |
| *10 | 6.7792 | 3.4530 | 1.49700 | 81.54 |
| *11 | −5.3799 | 0.5720 | | |
| 12 | −4.2240 | 0.8000 | 1.92286 | 18.90 |
| 13 | −20.4123 | 3.1282 | | |

TABLE 10

| | Example 5 | | | |
|---|---|---|---|---|
| Surface Number | 3 | 4 | 8 | 9 |
| KA | 4.9934146E+00 | −2.5862638E+00 | −2.8404148E+00 | −1.1058901E−01 |
| A4 | −2.0111170E−04 | −1.8820563E−04 | 3.0012683E−04 | −9.2440788E−05 |
| A6 | −1.1266814E−04 | 3.1690949E−05 | −9.0452106E−05 | −6.1338505E−05 |
| A8 | 3.4345220E−05 | 8.8245332E−06 | −1.0920471E−06 | −2.0351419E−07 |
| A10 | −2.4796008E−06 | −6.8754544E−07 | −1.2564167E−06 | −7.6947124E−07 |
| A12 | −1.2073443E−07 | −3.3955914E−07 | −7.9045891E−08 | −1.7485420E−08 |
| A14 | 3.7833736E−08 | 1.0008518E−07 | −5.6169679E−08 | −9.8143615E−09 |

TABLE 12

| Example 6 | | | | |
|---|---|---|---|---|
| Surface Number | 1 | 2 | 3 | 4 |
| KA | 1.0388813E+00 | 9.8027916E−01 | 4.9920557E+00 | −2.9130832E+00 |
| A4 | −5.8026923E−05 | −2.8184824E−04 | −2.4637941E−05 | −1.3499903E−04 |
| A6 | 1.6829806E−06 | 2.1929698E−05 | −1.4719627E−04 | 3.5082499E−05 |
| A8 | 1.1247450E−07 | −2.8553381E−06 | 3.3460159E−05 | 7.4142118E−06 |
| A10 | 1.8703198E−10 | −1.0399483E−06 | −2.5241465E−06 | −2.4316303E−06 |
| A12 | −3.8167564E−11 | −2.4352323E−08 | −7.1887757E−08 | 2.3743904E−07 |
| A14 | −2.2944987E−12 | 1.3279288E−08 | 2.3973346E−08 | 2.1016750E−08 |
| Surface Number | 8 | 9 | 10 | 11 |
| KA | −2.4001174E+00 | −6.6650853E−02 | 4.1114783E−01 | 9.6810255E−01 |
| A4 | 3.4410756E−04 | −1.0417861E−04 | −4.2394618E−05 | 1.7903684E−05 |
| A6 | −9.7140471E−05 | −5.3433764E−05 | −4.4436767E−06 | 1.3280146E−05 |
| A8 | −3.0047668E−06 | 1.1527252E−07 | 8.0670541E−07 | 6.5988611E−07 |
| A10 | −1.9130765E−06 | −7.9849999E−07 | 1.2824150E−08 | −4.0629926E−08 |
| A12 | 3.5028996E−07 | 6.3559364E−09 | 5.0995653E−10 | 8.3273147E−09 |
| A14 | −6.0558079E−08 | −6.9329469E−09 | −5.2398882E−09 | −6.6713943E−09 |

Example 7

Figure 17:
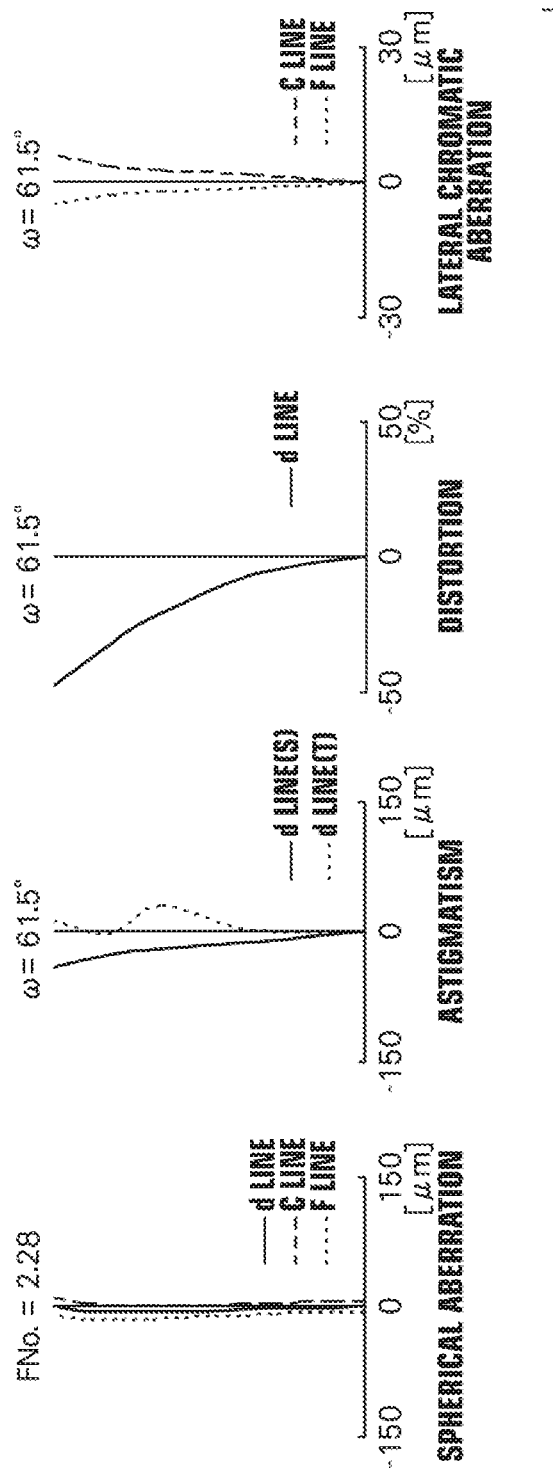
FIG. 17 is a collection of diagrams that illustrate aberrations of the imaging lens according to Example 7, which are spherical aberration, astigmatism, distortion, and lateral chromatic aberration in this order from the left side of the drawing sheet.
Figure 26:
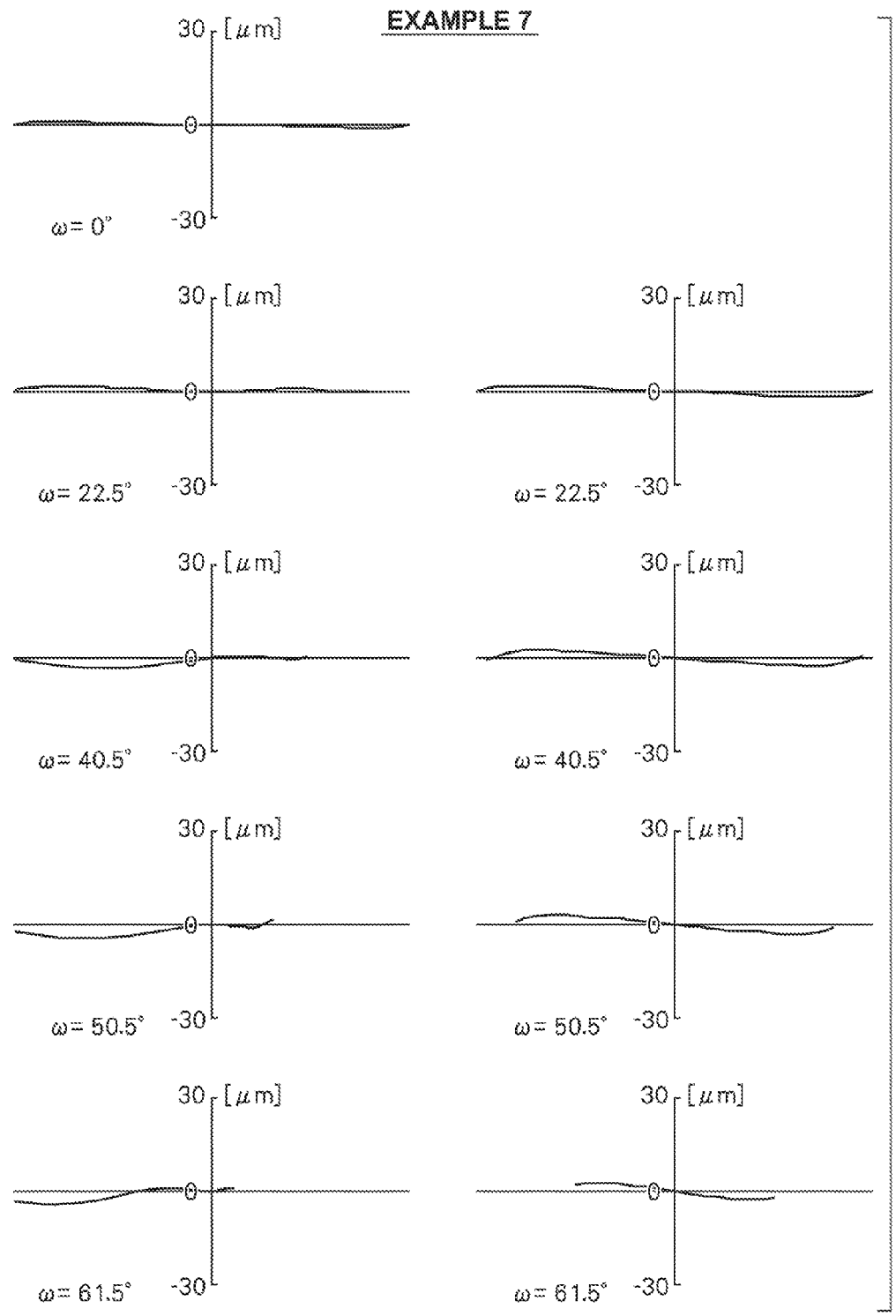
FIG. 26 is a collection of diagrams that illustrate transverse aberrations of the imaging lens of Example 7.

FIG. 8 is a cross sectional diagram that illustrates the lens configuration of the imaging lens of Example 7. Basic lens data are shown in Table 13 and aspherical surface coefficients are shown in Table 14 for the imaging lens of Example 7. In addition, FIG. 17 and FIG. 26 are collections of diagrams that illustrate various aberrations of the imaging lens of Example 7 in a state focused on an object at infinity.

TABLE 13

| Example 7 |
| f = 3.31, Bf = 2.92, F No. = 2.28, 2ω = 123.0° |

| Si | Ri | Di | Ndj | vdj |
|---|---|---|---|---|
| *1 | 46.3758 | 1.0100 | 1.58313 | 59.38 |
| *2 | 3.3668 | 2.4940 | | |

TABLE 13-continued

| Example 7 |
| f = 3.31, Bf = 2.92, F No. = 2.28, 2ω = 123.0° |

| Si | Ri | Di | Ndj | vdj |
|---|---|---|---|---|
| *3 | −14.4473 | 2.1850 | 1.80610 | 40.93 |
| *4 | −9.4876 | 1.5900 | | |
| 5 (St) | ∞ | 0.2500 | | |
| 6 | 8.9451 | 0.8000 | 1.92286 | 18.90 |
| 7 | 6.8588 | 1.9450 | | |
| *8 | 9.4375 | 2.3510 | 1.61881 | 63.85 |
| *9 | −7.1240 | 0.1550 | | |
| *10 | 7.2603 | 3.5270 | 1.61881 | 63.85 |
| *11 | −5.7164 | 0.5800 | | |
| 12 | −4.3444 | 1.0300 | 1.92286 | 18.90 |
| 13 | −29.1760 | 2.9218 | | |

TABLE 14

| Example 7 | | | | |
|---|---|---|---|---|
| Surface Number | 1 | 2 | 3 | 4 |
| KA | 1.0327202E+00 | 9.8019961E−01 | 4.9694277E+00 | −2.9099924E+00 |
| A4 | −5.9233330E−05 | −2.8689402E−04 | −2.2924366E−05 | −1.3621110E−04 |
| A6 | 1.6622778E−06 | 2.1692241E−05 | −1.4724490E−04 | 3.5068758E−05 |
| A8 | 1.0397916E−07 | −2.6848899E−06 | 3.3461636E−05 | 7.3135983E−06 |
| A10 | 2.7050247E−10 | −1.0428372E−06 | −2.5150332E−06 | −2.1791514E−06 |
| A12 | −3.6932844E−11 | −2.4352323E−08 | −4.6174102E−08 | 1.9558743E−07 |
| A14 | −2.2402612E−12 | 1.2497274E−08 | 1.9894415E−08 | 2.1777333E−08 |
| Surface Number | 8 | 9 | 10 | 11 |
| KA | −2.3612553E+00 | −6.6531916E−02 | 4.1053430E−01 | 9.6877644E−01 |
| A4 | 3.4471265E−04 | −1.0428498E−04 | −4.2462103E−05 | 1.7926632E−05 |
| A6 | −9.7181061E−05 | −5.3405254E−05 | −4.4621273E−06 | 1.3281746E−05 |
| A8 | −2.5002782E−06 | 1.1306410E−07 | 7.9091110E−07 | 6.4964412E−07 |
| A10 | −1.5481362E−06 | −8.0820586E−07 | 2.0366571E−08 | −4.0400932E−08 |
| A12 | 8.3508545E−09 | 1.6002736E−09 | 2.4018607E−08 | 5.8714236E−09 |
| A14 | −1.4760971E−08 | −9.9924589E−10 | −5.6182023E−09 | −5.5298781E−09 |

Example 8

Figure 18:
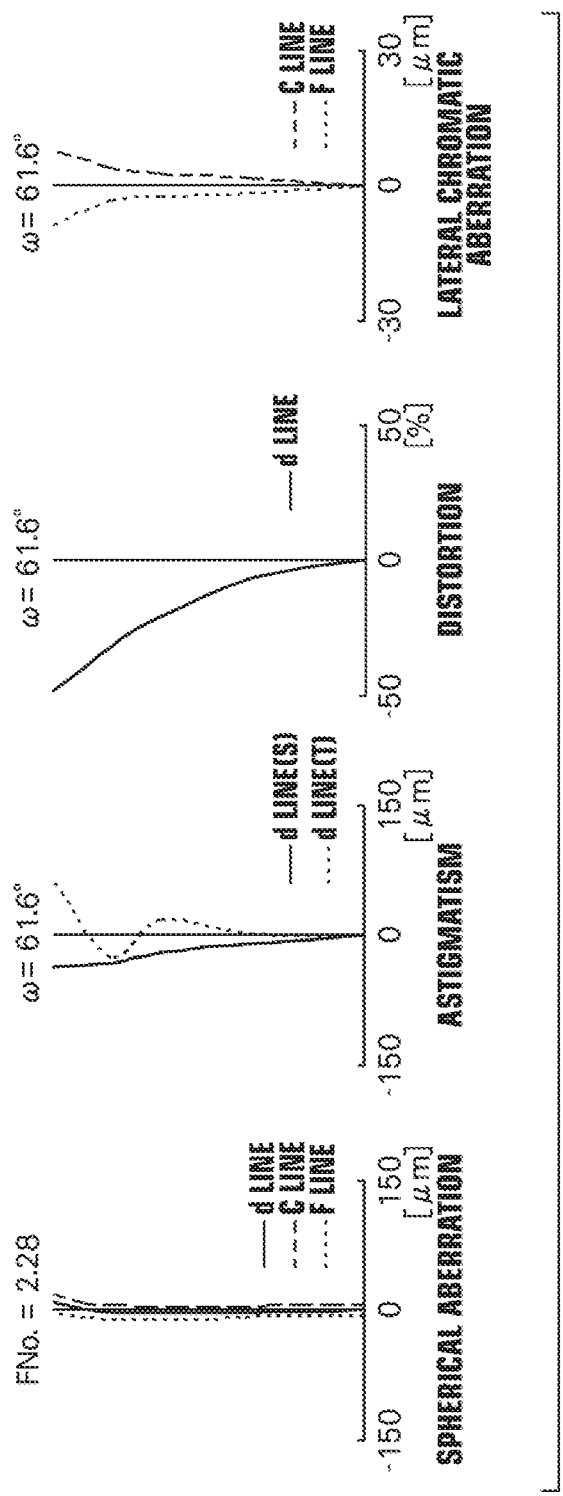
FIG. 18 is a collection of diagrams that illustrate aberrations of the imaging lens according to Example 8, which are spherical aberration, astigmatism, distortion, and lateral chromatic aberration in this order from the left side of the drawing sheet.
Figure 27:
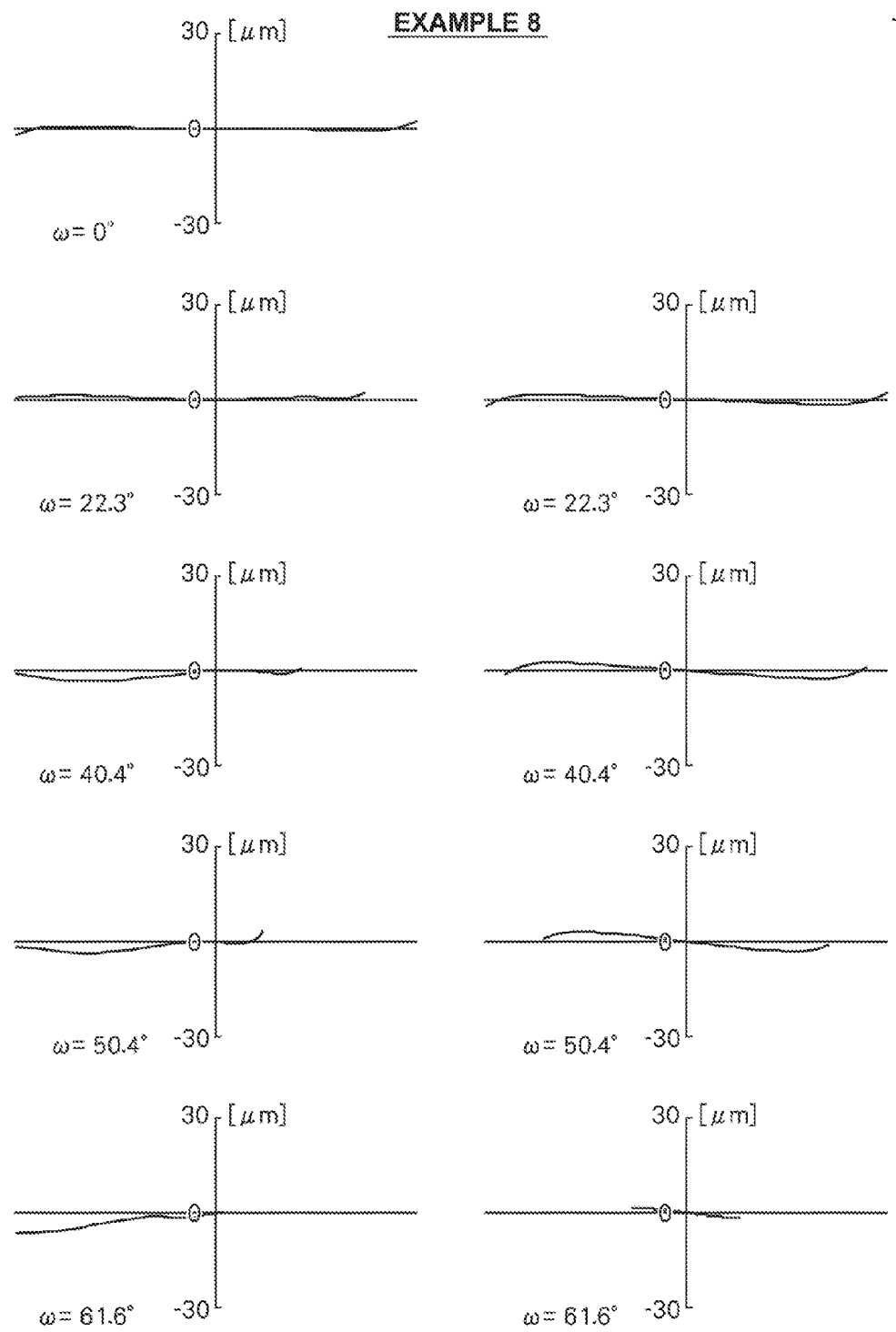
FIG. 27 is a collection of diagrams that illustrate transverse aberrations of the imaging lens of Example 8.

FIG. 9 is a cross sectional diagram that illustrates the lens configuration of the imaging lens of Example 8. Basic lens data are shown in Table 15 and aspherical surface coefficients are shown in Table 16 for the imaging lens of Example 8. In addition, FIG. 18 and FIG. 27 are collections of diagrams that illustrate various aberrations of the imaging lens of Example 8 in a state focused on an object at infinity.

Example 9

Figure 19:
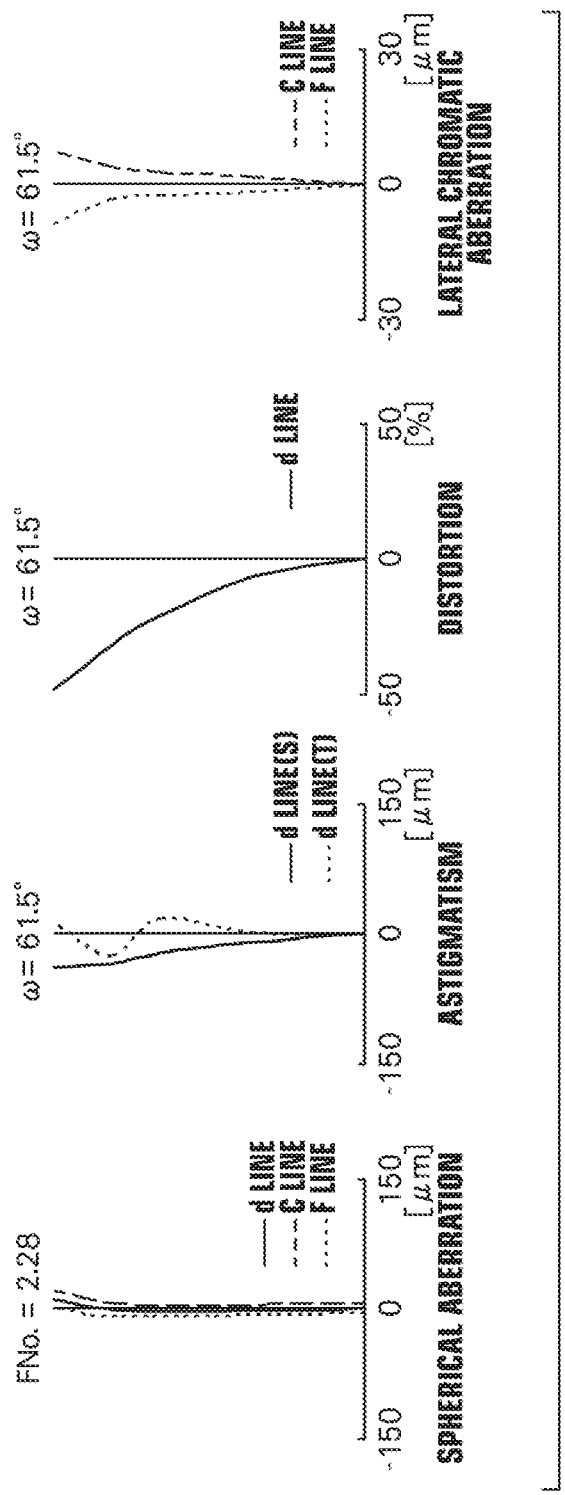
FIG. 19 is a collection of diagrams that illustrate aberrations of the imaging lens according to Example 9, which are spherical aberration, astigmatism, distortion, and lateral chromatic aberration in this order from the left side of the drawing sheet.
Figure 28:
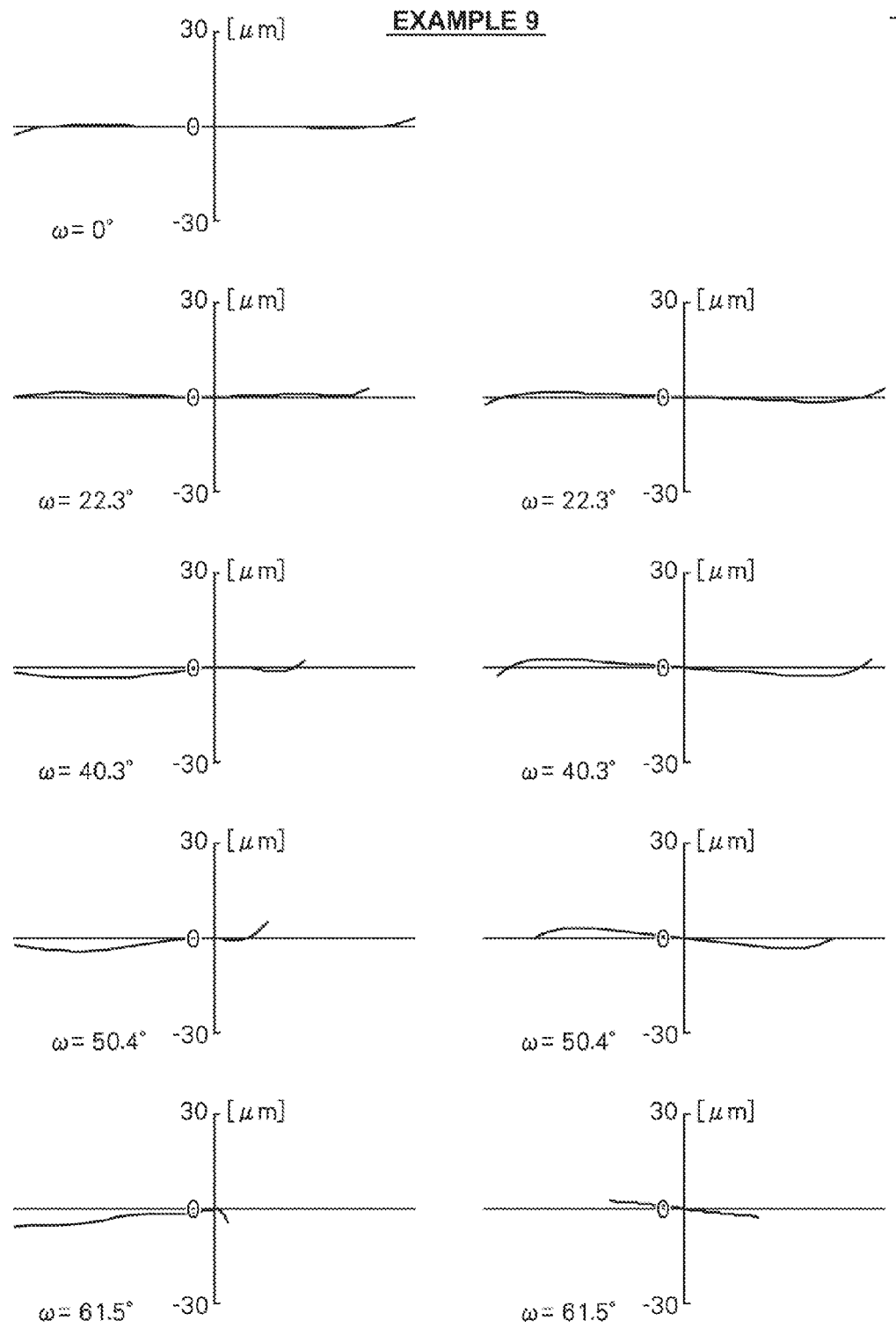
FIG. 28 is a collection of diagrams that illustrate transverse aberrations of the imaging lens of Example 9.

FIG. 10 is a cross sectional diagram that illustrates the lens configuration of the imaging lens of Example 9. Basic lens data are shown in Table 17 and aspherical surface coefficients are shown in Table 18 for the imaging lens of Example 9. In addition, FIG. 19 and FIG. 28 are collections of diagrams that illustrate various aberrations of the imaging lens of Example 9 in a state focused on an object at infinity.

TABLE 15

Example 8
f = 3.33, Bf = 3.24, F No. = 2.28, 2ω = 123.2°

| Si | Ri | Di | Ndj | νdj |
|---|---|---|---|---|
| *1 | 46.3736 | 1.0100 | 1.58313 | 59.38 |
| *2 | 3.3334 | 2.4570 | | |
| *3 | −14.4586 | 1.9610 | 1.80610 | 40.93 |
| *4 | −9.7697 | 1.5900 | | |
| 5 (St) | ∞ | 0.2500 | | |
| 6 | 9.3810 | 0.8000 | 1.92286 | 18.90 |
| 7 | 7.0625 | 2.1580 | | |
| *8 | 9.0419 | 2.3690 | 1.61881 | 63.85 |
| *9 | −7.0401 | 0.1550 | | |
| *10 | 7.1408 | 3.5260 | 1.58913 | 61.13 |
| *11 | −5.4447 | 0.5150 | | |
| 12 | −4.2995 | 0.8180 | 1.92286 | 18.90 |
| 13 | −26.6030 | 3.2364 | | |

TABLE 17

Example 9
f = 3.33, Bf = 3.24, F No. = 2.28, 2ω = 123.0°

| Si | Ri | Di | Ndj | νdj |
|---|---|---|---|---|
| *1 | 46.3736 | 1.0100 | 1.58313 | 59.38 |
| *2 | 3.3285 | 2.4450 | | |
| *3 | −14.5970 | 1.9320 | 1.80610 | 40.93 |
| *4 | −9.9257 | 1.5900 | | |
| 5 (St) | ∞ | 0.2500 | | |
| 6 | 9.4702 | 0.8000 | 1.92286 | 18.90 |
| 7 | 7.1652 | 2.1650 | | |
| *8 | 8.8618 | 2.3850 | 1.60300 | 65.44 |
| *9 | −6.9866 | 0.1550 | | |
| *10 | 7.0553 | 3.5560 | 1.58913 | 61.13 |
| *11 | −5.4694 | 0.5290 | | |
| 12 | −4.2952 | 0.8000 | 1.92286 | 18.90 |
| 13 | −25.5142 | 3.2368 | | |

TABLE 16

Example 8

| Surface Number | 1 | 2 | 3 | 4 |
|---|---|---|---|---|
| KA  | 1.0334726E+00  | 9.8030124E−01  | 4.9801959E+00  | −2.9122855E+00 |
| A4  | −5.8024852E−05 | −2.8189771E−04 | −2.4590119E−05 | −1.3544314E−04 |
| A6  | 1.6956276E−06  | 2.1923822E−05  | −1.4721080E−04 | 3.5104720E−05 |
| A8  | 1.0430474E−07  | −2.7579193E−06 | 3.3457329E−05  | 7.3387160E−06 |
| A10 | 2.4946414E−10  | −1.0524835E−06 | −2.5235853E−06 | −2.1960366E−06 |
| A12 | −3.8427086E−11 | −2.4352323E−08 | −4.8215408E−08 | 1.9110873E−07 |
| A14 | −2.2861582E−12 | 1.2203478E−08  | 1.9791472E−08  | 2.1131665E−08 |

| Surface Number | 8 | 9 | 10 | 11 |
|---|---|---|---|---|
| KA  | −2.3562538E+00 | −6.6647527E−02 | 4.1052883E−01  | 9.6875745E−01 |
| A4  | 3.4502806E−04  | −1.0417222E−04 | −4.2400364E−05 | 1.7945755E−05 |
| A6  | −9.7141826E−05 | −5.3439129E−05 | −4.4416486E−06 | 1.3280570E−05 |
| A8  | −2.5159409E−06 | 1.1094541E−07  | 7.9193048E−07  | 6.4989595E−07 |
| A10 | −1.5338407E−06 | −8.0812181E−07 | 2.0221549E−08  | −4.0389780E−08 |
| A12 | 1.0116120E−08  | 1.3572568E−09  | 2.4127158E−08  | 5.8406600E−09 |
| A14 | −1.5851986E−08 | −1.0649370E−09 | −5.7014824E−09 | −5.4950473E−09 |

TABLE 18

Example 9

| Surface Number | 1 | 2 | 3 | 4 |
|---|---|---|---|---|
| KA | 1.0334431E+00 | 9.8030077E−01 | 4.9803975E+00 | −2.9122859E+00 |
| A4 | −5.8024774E−05 | −2.8189727E−04 | −2.4592151E−05 | −1.3541150E−04 |
| A6 | 1.6955864E−06 | 2.1923972E−05 | −1.4721083E−04 | 3.5104654E−05 |
| A8 | 1.0431490E−07 | −2.7590165E−06 | 3.3457360E−05 | 7.3374649E−06 |
| A10 | 2.5067838E−10 | −1.0530540E−06 | −2.5216200E−06 | −2.1893681E−06 |
| A12 | −3.8448124E−11 | −2.4352323E−08 | −4.7567233E−08 | 1.9800451E−07 |
| A14 | −2.2859516E−12 | 1.2838233E−08 | 2.0615387E−08 | 2.1789265E−08 |

| Surface Number | 8 | 9 | 10 | 11 |
|---|---|---|---|---|
| KA | −2.3566731E+00 | −6.6641328E−02 | 4.1054108E−01 | 9.6875465E−01 |
| A4 | 3.4500517E−04 | −1.0417181E−04 | −4.2399135E−05 | 1.7945446E−05 |
| A6 | −9.7141907E−05 | −5.3439221E−05 | −4.4417478E−06 | 1.3280435E−05 |
| A8 | −2.5227471E−06 | 1.1083583E−07 | 7.9178890E−07 | 6.4981907E−07 |
| A10 | −1.5434752E−06 | −8.0806789E−07 | 2.0223586E−08 | −4.0474813E−08 |
| A12 | 1.2915844E−08 | 1.5164494E−09 | 2.4212796E−08 | 5.9003760E−09 |
| A14 | −1.6042183E−08 | −1.0535330E−09 | −5.6950966E−09 | −5.4939693E−09 |

Table 19 shows the positions and the diameters of the openings of the first light shielding member 4 and the second light shielding member 5 for Examples 1 through 9. The positions are shown such that the direction toward the image side from reference surfaces is positive. The units of the numerical values shown in Table 19 are mm.

TABLE 19

| | First Light Shielding Member | | Second Light Shielding Member | |
|---|---|---|---|---|
| | Distance from surface toward image side of second lens | Diameter of opening | Distance from surface toward image side of third lens | Diameter of opening |
| Example 1 | 1.19 | φ3.1 | 1.45 | φ3.6 |
| Example 2 | 0.97 | φ3.1 | 1.55 | φ3.8 |
| Example 3 | 1.06 | φ3.1 | 1.81 | φ3.8 |
| Example 4 | 1.38 | φ3.1 | 2.00 | φ3.8 |
| Example 5 | 1.00 | φ3.1 | 1.65 | φ3.8 |
| Example 6 | 1.19 | φ3.1 | 2.26 | φ4.0 |
| Example 7 | 1.19 | φ3.1 | 1.89 | φ3.64 |
| Example 8 | 1.19 | φ3.1 | 2.10 | φ3.7 |
| Example 9 | 1.19 | φ3.1 | 2.11 | φ3.8 |

Table 20 shows the focal length f of the entire lens system, the focal lengths f1 through f6 of the first lens L1 through the sixth lens L6, values related to the conditional formulae, and values corresponding to Conditional Formulae (1) through (8) for Examples 1 through 9. The numbers (1) through (8) in the leftmost column of Table 20 are the numbers of the Conditional Formulae (1) through (8). The numerical values shown in Table 20 are those with reference to the d line except for those in the column related to Conditional Formula (8). The values of dN/dT (L4) and dN/dT (L5) in Table 20 respectively are the relative temperature coefficients of the refractive indices of the materials of the fourth lens L4 and the fifth lens L5 with respect to a wavelength of 632.8 nm within a temperature range from 20° C. to 40° C. Numerical values are shown only for materials of which the relative temperature coefficients are negative. The units of numerical values for dN/dT (L4) and dN/dT (L5) in Table 20 are $\cdot 10^{-6}/°$ C. The material is shown before the slash within the parentheses, and the manufacturer of the material is shown after the slash. Note that in Table 20, K. K. Ohara is shown as OHARA, and HOYA K. K. is shown as HOYA.

TABLE 20

| | | Example 1 | Example 2 | Example 3 | Example 4 | Example 5 | Example 6 | Example 7 | Example 8 | Example 9 |
|---|---|---|---|---|---|---|---|---|---|---|
| | f | 3.3592 | 3.3499 | 3.3117 | 3.3790 | 3.3434 | 3.3278 | 3.3052 | 3.3272 | 3.3298 |
| | f1 | −6.3304 | −5.9219 | −6.0124 | −4.9104 | −4.9776 | −6.1887 | −6.2800 | −6.2129 | −6.2030 |
| | f2 | 22.3397 | 20.8310 | 25.2380 | 12.7480 | 19.1366 | 31.3385 | 28.6511 | 31.4936 | 32.4806 |
| | f3 | −22.1027 | −21.5207 | −23.9853 | −28.2556 | −20.3131 | −30.4341 | −39.0517 | −37.1106 | −38.2754 |
| | f4 | 5.9148 | 5.7985 | 6.0557 | 7.6865 | 6.2984 | 6.2562 | 6.9368 | 6.7782 | 6.8674 |
| | f5 | 5.6010 | 5.8509 | 5.7544 | 5.1735 | 5.6496 | 6.6635 | 5.7677 | 5.8515 | 5.8449 |
| | f6 | −5.4705 | −5.6415 | −5.8124 | −5.8642 | −6.0381 | −5.9115 | −5.6435 | −5.6566 | −5.6995 |
| | f12 | −13.5528 | −12.8912 | −10.4902 | −14.2720 | −9.3149 | −9.6789 | −10.5949 | −9.7580 | −9.5665 |
| | f45 | 3.5024 | 3.4947 | 3.5946 | 3.5743 | 3.5865 | 3.9151 | 3.8001 | 3.8170 | 3.8399 |
| (1) | R3/f | −3.5342 | −4.0140 | −4.8938 | −263.9823 | −5.9140 | −4.3874 | −4.3711 | −4.3456 | −4.3838 |
| (2) | f1/f | −1.8845 | −1.7678 | −1.8155 | −1.4532 | −1.4888 | −1.8597 | −1.9000 | −1.8673 | −1.8629 |
| (3) | R4/f | −2.3295 | −2.4140 | −2.8645 | −3.0094 | −2.7073 | −2.9419 | −2.8705 | −2.9363 | −2.9809 |
| (4) | f12/f | −4.0345 | −3.8483 | −3.1677 | −4.2238 | −2.7861 | −2.9085 | −3.2055 | −2.9328 | −2.8730 |
| (5) | f45/f | 1.0426 | 1.0432 | 1.0854 | 1.0578 | 1.0727 | 1.1765 | 1.1497 | 1.1472 | 1.1532 |
| (6) | f4/f | 1.7608 | 1.7309 | 1.8286 | 2.2748 | 1.8838 | 1.8800 | 2.0987 | 2.0372 | 2.0624 |
| (7) | f5/f | 1.6674 | 1.7466 | 1.7376 | 1.5311 | 1.6898 | 2.0024 | 1.7450 | 1.7587 | 1.7553 |
| (8) | dN/dT(L4) | | | | | | | −3.0 (M-PCD4/ HOYA) | −3.0 (M-PCD4/ HOYA) | −2.6 (S-PHM53/ OHARA) |

TABLE 20-continued

| | | Example 1 | Example 2 | Example 3 | Example 4 | Example 5 | Example 6 | Example 7 | Example 8 | Example 9 |
|---|---|---|---|---|---|---|---|---|---|---|
| (8) | dN/dT(L5) | −3.0 (M-PCD4/ HOYA) | −3.0 (M-PCD4/ HOYA) | −3.0 (M-PCD4/ HOYA) | | −3.0 (M-PCD4/ HOYA) | −6.2 (S-FPL51/ OHARA) | −3.0 (M-PCD4/ HOYA) | | |

As can be understood from the above data, the imaging lenses of Examples 1 through 9 have six lenses, are configured to be compact, achieve wide angles of view with maximum angles of view within a range from 120° to 130°, have small F numbers within a range from 2.2 to 2.3, and favorably correct various aberrations to achieve high optical performance.

Figure 29:
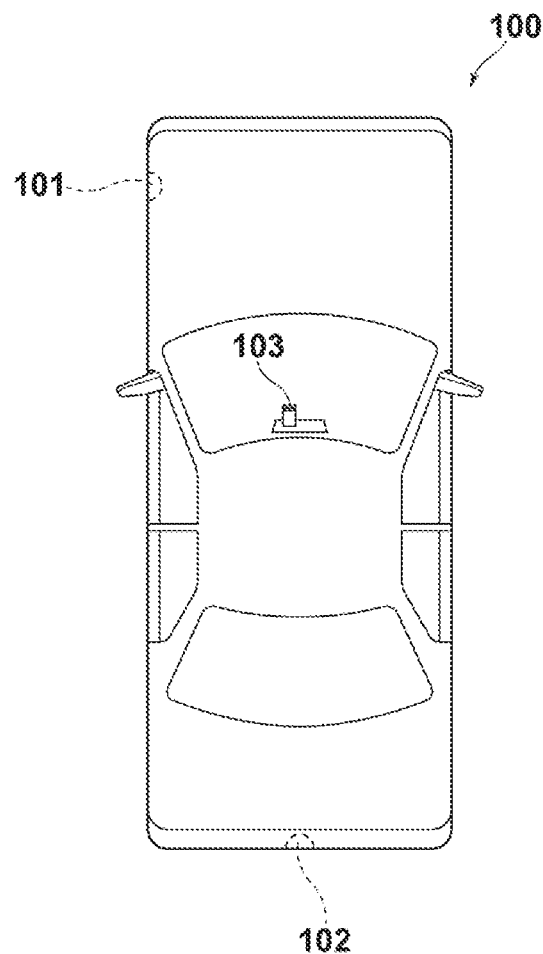
FIG. 29 is a diagram for explaining the arrangement of imaging apparatuses to be mounted on a vehicle according to an embodiment of the present disclosure.

FIG. 29 illustrates the manner in which imaging apparatuses equipped with the imaging lens of the present embodiment are mounted on an automobile 100 as an example of utilization. In FIG. 29, the automobile 100 is equipped with an externally mounted camera 101 for imaging a blind spot range at the side surface on the side of the passenger seat, an externally mounted camera 102 for imaging a blind spot range at the rear side of the automobile 100, and a internally mounted camera 103 which is mounted on the back surface of the rear view mirror and images the same range as the field of view of a driver. The externally mounted camera 101, the externally mounted camera 102, and the internally mounted camera 103 are imaging apparatuses, and are each equipped with an imaging lens according to an embodiment of the present disclosure and an imaging element that converts optical images formed by the imaging lens into electric signals. The vehicle mounted cameras of the present embodiment (the externally mounted camera 101, the externally mounted camera 102, and the internally mounted camera 103) are equipped with imaging lenses according to the embodiment of the present disclosure. Therefore, the vehicle mounted cameras are capable of performing imaging under low light conditions, have wide angles of view, and can obtain favorable images from the central portion through the peripheral portions of the image formation regions thereof.

The present disclosure has been described with reference to the embodiments and Examples. However, the present disclosure is not limited to the above embodiments and Examples, and various modifications are possible. For example, the values of the radii of curvature, the surface distances, the refractive indices, the Abbe's numbers, the aspherical surface coefficients, etc. of each of the lenses are not limited to those exemplified in the above Examples, and may be different values.

In addition, materials that satisfy Conditional Formula (8) and are utilizable as optical materials are not limited to the three types shown in the Examples, and performance can be optimized by employing S-PHM52 or S-FPM2 by Ohara, FCD1 by HOYA, H-ZPK2 by CDGM Glass, etc., for example. In addition, M-PCD4 is an optical glass for glass molds by HOYA, but optical glass PCD4 for polishing by HOYA may also be employed to obtain equivalent advantageous effects.

In addition, the imaging apparatus according to embodiments of the present disclosure are not limited to vehicle mounted cameras. The imaging apparatus of the present disclosure may be a camera for a portable terminal, a surveillance camera, a digital camera, etc.

What is claimed is:

1. An imaging lens consisting of, in order from the object side to the image side:
   a first lens having a negative refractive power and a concave surface toward the image side;
   a second lens having a positive refractive power and a convex surface toward the image side;
   a third lens having a negative refractive power and a concave surface toward the image side;
   a fourth lens having a positive refractive power and is of a biconvex shape;
   a fifth lens having a positive refractive power and is of a biconvex shape; and
   a sixth lens having a negative refractive power and a concave surface toward the object side; and
   Conditional Formula (1) below being satisfied:

$$R3/f<0 \tag{1}$$

wherein R3 is the radius of curvature of the surface of the second lens toward the object side, and f is the focal length of the entire lens system.

2. An imaging lens as defined in claim 1, in which Conditional Formula (1-1) below is satisfied:

$$-3.00<R3/f<-2 \tag{1-1}$$

3. An imaging lens as defined in claim 1, in which Conditional Formula (2) below is satisfied:

$$-2.1<f1/f<-1.3 \tag{2}$$

wherein f1 is the focal length of the first lens.

4. An imaging lens as defined in claim 3, in which Conditional Formula (2-1) below is satisfied:

$$-2.0<f1/f<-1.4 \tag{2-1}$$

5. An imaging lens as defined in claim 1, in which Conditional Formula (3) below is satisfied:

$$-3.5<R4/f<-2.0 \tag{3}$$

wherein R4 is the radius of curvature of the surface of the second lens toward the image side.

6. An imaging lens as defined in claim 5, in which Conditional Formula (3-1) below is satisfied:

$$-3.2<R4/f<-2.2 \tag{3-1}$$

7. An imaging lens as defined in claim 1, in which Conditional Formula (4) below is satisfied:

$$-5<f12/f<-2 \tag{4}$$

wherein f12 is the combined focal length of the first lens and the second lens.

8. An imaging lens as defined in claim 7, in which Conditional Formula (4-1) below is satisfied:

$$-4.7<f12/f<-2.3 \tag{4-1}$$

9. An imaging lens as defined in claim 1, in which Conditional Formula (5) below is satisfied:

$$0.9<f45/f<1.3 \tag{5}$$

wherein f45 is the combined focal length of the fourth lens and the fifth lens.

10. An imaging lens as defined in claim 9, in which Conditional Formula (5-1) below is satisfied:

$$0.9 < f45/f < 1.2 \tag{5-1}$$

11. An imaging lens as defined in claim 9, in which Conditional Formula (6) below is satisfied:

$$1.5 < f4/f < 3.0 \tag{6}$$

wherein f4 is the focal length of the fourth lens.

12. An imaging lens as defined in claim 11, in which Conditional Formula (6-1) below is satisfied:

$$1.6 < f4/f < 2.6 \tag{6-1}$$

13. An imaging lens as defined in claim 9, in which Conditional Formula (7) below is satisfied:

$$1.4 < f5/f < 2.2 \tag{7}$$

wherein f5 is the focal length of the fifth lens.

14. An imaging lens as defined in claim 13, in which Conditional Formula (7-1) below is satisfied:

$$1.45 < f5/f < 2.1 \tag{7-1}$$

15. An imaging lens as defined in claim 1, in which the material of at least one of the fourth lens and the fifth lens satisfies Conditional Formula (8) below:

$$dN/dT < 0 \tag{8}$$

wherein dN/dT is the relative temperature coefficient of the refractive index of the material with respect to a wavelength of 632.8 nm within a temperature range from 20° C. to 40° C.

16. An imaging apparatus equipped with an imaging lens as defined in claim 1.

\* \* \* \* \*